United States Patent [19]

Chiba et al.

[11] Patent Number: 4,526,931
[45] Date of Patent: Jul. 2, 1985

[54] WHITENING-RESISTANT, HIGHLY MELT-VISCOELASTIC ETHYLENE-PROPYLENE COPOLYMER AND PROCESS FOR PRODUCING THE SAME

[75] Inventors: Hiromasa Chiba; Takakiyo Harada; Katsumi Kumahara; Shunji Kawazoe; Akihiro Sato, all of Ichiharashi, Japan

[73] Assignee: Chisso Corporation, Osaka, Japan

[21] Appl. No.: 658,868

[22] Filed: Oct. 9, 1984

[30] Foreign Application Priority Data

Oct. 31, 1983 [JP] Japan ................... 58-204438

[51] Int. Cl.³ .......................................... C08F 297/08
[52] U.S. Cl. .................... 525/268; 525/240; 525/247; 525/323
[58] Field of Search ............. 525/240, 247, 268, 323

[56] References Cited

U.S. PATENT DOCUMENTS 4,245,062 1/1981 Suzuki et al. .................. 525/240
4,254,237 3/1981 Shiga et al. .................... 525/323
4,337,326 6/1982 Shiga et al. .................... 525/323

FOREIGN PATENT DOCUMENTS 3246447 7/1983 Fed. Rep. of Germany ...... 526/351
44-20621 9/1969 Japan ............................ 525/323
52-8094 1/1977 Japan ............................ 525/323

Primary Examiner—Edward J. Smith
Attorney, Agent, or Firm—Fred Philpitt

[57] ABSTRACT

A whitening-resistant, highly melt-viscoelastic ethylene-propylene copolymer and process for producing the same are provided, which copolymer is produced by copolymerizing ethylene with propylene in the presence of a specified stereoregular catalyst and at four stages under specified conditions, the catalyst being prepared by reacting an organoaluminum compound or its reaction product with an electron donor, with $TiCl_4$, reacting the resulting solid product with an electron donor and an electron acceptor, and combining the resulting solid product with an organo-aluminum compound and an aromatic carboxylic acid ester so as to give a specified ratio, and at the four stages, the ethylene contents in monomers fed, the proportion of polymerization amounts and the intrinsic viscosities of polymers formed being specified.

11 Claims, No Drawings

WHITENING-RESISTANT, HIGHLY MELT-VISCOELASTIC ETHYLENE-PROPYLENE COPOLYMER AND PROCESS FOR PRODUCING THE SAME

BACKGROUND OF THE INVENTION

1. Field of the Invention

This invention relates to a whitening-resistant, highly melt-viscoelastic propylene copolymer and a process for producing the same. More particularly it relates to a propylene copolymer having a high stiffness, almost no impact- or folding-whitening, a superior impact resistance and also a high melt-viscoelasticity, obtained by using a specified Ziegler-Natta catalyst and also employing a four-stage ethylene-propylene copolymerization process, and a process for producing the same.

The present invention relates also to a propylene copolymer having a superior sheet post-processability (often referred to sheet moldability), blow moldability and injection moldability, and a process for producing the same.

2. Description of the Prior Art

Sheets produced by processing known polypropylene have drawbacks that sagging of the sheets at the time of heat molding for post-processing (or secondary processing) is rapid, the ranges of processing conditions are narrow, the molding efficiency is inferior, the above sagging is large in the case of sheets of broad width, the thickness of post-processed products is liable to be uneven, and weight wrinkles are liable to occur. Thus, only small type molded products can be produced.

On the other hand, when known polypropylene is used for blow molding, the following problems are raised:

(1) Since parison draw-down at the time of molding is large, the thickness of molded products is uneven. Thus, blow molding process can be applied only to small type commodities.

(2) If a high molecular weight polypropylene is used in order to prevent the above drawn-down, there occur an inferior fluidity, a high load at the time of molding, a large energy loss and a danger of causing mechanical troubles, and further, molded products have an intense surface-roughening to lose their commodity value. In order to improve the above sheet-moldability and blow moldability of polypropylene, certain proposals have so far been made. For example, Japanese patent publication No. Sho 47-80614 (1972) and Japanese patent application laid-open No. Sho 50-8848 (1975) disclose a process of blending a low density polyethylene or the like to polypropylene. However, molded products using such a blend are liable to cause surface-roughening, and for preventing this, a powerful kneading is required at the time of melting; thus the process is restricted in the aspect of choice of kneader and power consumption.

Further, Japanese patent application laid-open No. Sho 56-70014 (1981) proposes a two-stage copolymerization process wherein a difference in molecular weight and a difference in polymer amount are afforded between the respective polymer parts formed at the respective stages. However, copolymers obtained according to the process have insufficient flow characteristics at the time of melting.

Still further, Japanese patent application laid-open No. Sho 55-118906 (1980) discloses a process wherein the relationship between the melt swelling ratio (hereinafter abbreviated to SR) of polypropylene and its melt flow rate is made definite. In the case of this process, however, the relationship between the melt flow rate and the flow characteristics at the time of melting has not been taken into consideration, and SR, too, is not univocally determined in its relation to the extrusion shear rate of molten polypropylene; hence the process cannot always correspond to the improvements in various processing characteristics relative to the present invention.

Further, crystalline polypropylene (hereinafter abbreviated to polypropylene) obtained by polymerizing propylene by the use of a stereoregular catalyst has superior physical properties in stiffness, heat resistance, etc. On the other hand, there is a problem that its impact strength, particularly the impact strength at low temperatures is low, and in this respect, the range of its practical use has been restricted. In order to overcome this drawback, a number of processes wherein propylene and ethylene or another $\alpha$-olefin are block-copolymerized have been proposed. According to these copolymerization processes, it is possible to obtain propylene-$\alpha$-olefin copolymers having a superior low temperature impact resistance without damaging stiffness, heat resistance, etc. which are superior characteristics of polypropylene. On the other hand, as to such copolymers, a new drawback in physical properties as described below occurred, that is, a drawback that when molded products are produced using such copolymers, or molded products are transported or used, the impact or folding force loaded on the molded products readily whitens the loaded parts. The thus whitened molded products naturally lose their commodity value. As to processes for overcoming such a drawback of propylene-$\alpha$-olefin block copolymers (hereinafter abbreviated to block copolymers), a number of proposals have been made. For example, (1) Japanese patent application laid-open Nos. Sho 55-58245 (1980), Sho 55-10433 (1980), Sho 56-72042 (1981) and Sho 57-13741 (1982), etc. are directed to processes of blending polyethylene with block copolymers. These processes exhibit an effectiveness of overcoming the whitening, which, however, is still insufficient, and industrially there is raised a problem as to a uniformly blending process and further, blending cost, too, cannot be disregarded. Next, (2) Japanese patent publication Nos. Sho-47-26190 (1972) and Sho 49-24593 (1974) and Japanese patent application laid-open No. Sho 58-15548 (1983) disclose a multi-stage polymerization wherein propylene is homopolymerized at the first stage, and successively ethylene and propylene are copolymerized in a multi-stage manner. In these cases, however, as to the resulting block copolymers, reduction in stiffness can be prevented, but the effectiveness of overcoming the whitening is still insufficient. Next, (3) Japanese patent application laid-open No. Sho 54-40895 (1979) discloses a process for producing ethylene-propylene block copolymers wherein at the stage where ethylene-propylene copolymer part is prepared in the production of the copolymers, the hydrogen concentration is raised to thereby reduce the corresponding molecular weight to the part. However, the resulting block copolymers are insufficient in the improvement of low temperature impact strength. Next, (4) Japanese patent application laid-open Nos. Sho 54-13963 (1979), Sho 55-16048 (1980), Sho 56-55416 (1981), Sho 57-34112 (1982) and Sho 57-67611 (1982) disclose a process for a multi-stage copolymerization of ethylene with propylene wherein a small amount of ethylene is fed in the preparation process of propylene polymer at the first stage, and polymerization for ethylene-propylene copolymer is carried out successively at a multi-stage since the second stage. However, the thus obtained block copolymers are reduced in the stiffness and heat resistance which are characteristics intrinsic of polypropylene, to a large extent; hence the above various processes, too, cannot be said to be preferable.

On the other hand, a number of processes of improving the stiffness of block copolymers mainly by catalyst improvements have been proposed. Namely (5) Japanese patent publication Nos. Sho 47-8207 (1972), Sho 49-13231 (1974) and Sho 49-13512 (1974) have proposed an improved process of adding a third component to catalyst. Further, (6) Japanese patent application laid-open Nos. Sho 55-764 (1980), Sho 54-152095 (1979) and Sho 53-29390 (1978) and Japanese patent publication No. Sho 55-8011 (1980) have proposed an improved process using a specified catalyst. However, the proposals of the above (5) and (6) are directed to a technique for making the reduction extent of the stiffness of the resulting block copolymers as small as possible, as compared with polypropylene (homopolymer), so to speak, for relieving the drawback, but have not yet come to enable the polymers to acquire the same or higher level of stiffness as that of the homopolymer.

SUMMARY OF THE INVENTION

The object of the present invention is to solve the above-mentioned problems of the prior art and provide a whitening-resistant, high stiffness, high impact strength and highly melt-viscoelastic propylene copolymer and a process for producing the same. For this object, the kind of the stereoregular catalyst used has been specified, and polymerization conditions employed when propylene and ethylene are polymerized at four stages have been restricted. As a result, all the above problems have been solved, and there could have been invented a propylene copolymer which is superior in heat resistance, stiffness and low temperature impact resistance, hardly causes a whitening phenomenon even when stresses such as impact, folding, etc. are applied, has a melt-viscoelasticity suitable for sheet post-processability and blow moldability and has a superior resin fluidity at the time of high rate extrusion in injection molding, and a process for producing the same.

The present invention has a first aspect described in the following [A] and a second aspect described in the following [B]:

[A]

(1) A whitening-resistant, highly melt-viscoelastic ethylene-propylene copolymer, obtained by copolymerizing propylene with ethylene,
in the presence of a catalyst prepared by reacting an organoaluminum compound (I) or a reaction product (VI) of an organoaluminum compound (I) with an electron donor (A), with titanium tetrachloride (C), further reacting the resulting solid product (II) with an electron donor (A) and an electron acceptor (B), and combining the resulting solid product (III) with an organoaluminum compound (IV) and an aromatic carboxylic acid ester (V), the molar ratio (V/III) of the aromatic carboxylic acid ester to the solid product (III) being in the range of 0.1 to 10.0, at the following four stages:
(1) the first stage wherein propylene or a mixed gas of ethylene with propylene, containing 0 to 7.5% by weight of ethylene, is fed to a reactor to form a polymer; successively,
(2) the second stage wherein propylene or a mixed gas of ethylene with propylene, containing 0 to 15% by weight of ethylene, is fed to the reactor to form a polymer;
(3) the amount of ethylene fed at the first stage and the second stage being in the range of 0.7 to 7.5% by weight based on the total amount of the mixed gas;
(4) 60 to 89% by weight of the total polymerization amount (excluding soluble copolymer) being polymerized at the first stage and the second stage, and the proportion of the polymerization amount at the first stage to that at the second stage being in the range of 0.65:0.35 to 0.35:0.65;
(5) between the intrinsic viscosities of the polymers formed at the first stage and the second stage, the intrinsic viscosity of the polymer having a higher molecular weight $[\eta]_H$ and that of the polymer having a lower molecular weight $[\eta]_L$, having a relationship satisfying the following equation:

$$3.0 \leq [\eta]_H - [\eta]_L \leq 6.5 \qquad (1);$$

successively, (6) the third stage wherein ethylene or a mixed gas of ethylene with propylene, containing 70 to 100% by weight of ethylene, is fed to the reactor to polymerize 5 to 17% by weight of the total polymerization amount (excluding soluble copolymer);
(7) the intrinsic viscosity of a polymer formed at the third stage $[\eta]_3$ having a relationship satisfying the following equation:

$$[\eta]_L \leq [\eta]_3 \leq [\eta]_H \qquad (2);$$

successively, (8) the fourth stage wherein a mixed gas of ethylene with propylene containing 40 to 70% by weight of ethylene is fed to the reactor to copolymerize 6 to 23% by weight of the total polymerization amount (excluding soluble copolymer); and
(9) the intrinsic viscosity of the copolymer formed at the fourth stage $[\eta]_4$ satisfying the following equation:

$$[\eta]_L \leq [\eta]_4 \leq [\eta]_H \qquad (3).$$

(2) A copolymer according to the above item (1) wherein the organoaluminum compound (IV) is a dialkylaluminum monohalide.
(3) A copolymer according to the above item (1) wherein a small amount of an α-olefin is reacted with the combination of the solid product (III) with the organoaluminum compound (IV) and the resulting preactivated catalyst is used as the catalyst.
(4) A copolymer according to the above item (1) wherein at each of the first stage to the fourth stage, hydrogen is used to adjust the intrinsic viscosities of the respective polymers.

[B]

(5) A process for producing a whitening-resistant, highly melt-viscoelastic ethylene-propylene copolymer, which process comprises copolymerizing propylene with ethylene, in the presence of a catalyst prepared by reacting an organoaluminum compound (I) or a reaction product (VI) of an organoaluminum compound (I) with an electron donor (A), with titanium tetrachloride (C), further reaction the resulting solid product (II) with an electron donor (A) and an electron acceptor (B), and combining the resulting solid product (III) with an organoaluminum compound (IV) and an aromatic carboxylic acid ester (V), the molar ratio (V/III) of the aromatic carboxylic acid ester to the solid product (III) being in the range of 0.1 to 10.0, at the following four stages:
(1) the first stage wherein propylene or a mixed gas of ethylene with propylene, containing 0 to 7.5% by weight of ethylene, is fed to a reactor to form a polymer, successively,
(2) the second stage wherein propylene or a mixed gas of ethlene with propylene, containing 0 to 15% by weight of ethylene, is fed to the reactor to form a polymer;
(3) the amount of ethylene fed at the first stage and the second stage being in the range of 0.7 to 7.5% by weight based on the total amount of the mixed gas;
(4) 60 to 89% by weight of the total polymerization amount (excluding soluble copolymer) being polymerized at the first stage and the second stage, and the proportion of the polymerization amount at the first stage to that at the second stage being in the range of 0.65:0.35 to 0.35:0.65;
(5) between the intrinsic viscosities of the polymers formed at the first stage and the second stage, the intrinsic viscosity of the polymer having a higher molecular weight $[\eta]_H$ and that of the polymer having a lower molecular weight $[\eta]_L$, having a relationship satisfying the following equation:

$$3.0 \leq [\eta]_H - [\eta]_L \leq 6.5 \qquad (1);$$
successively, (6) the third stage wherein ethylene or a mixed gas of ethylene with propylene, containing 70 to 100% by weight of ethylene, is fed to the reactor to polymerize 5 to 17% by weight of the total polymerization amount (excluding soluble copolymer);
(7) the intrinsic viscosity of a polymer formed at the third stage $[\eta]_3$ having a relationship satisfying the following equation:

$$[\eta]_L \leq [\eta]_3 \leq [\eta]_H \qquad (2);$$
successively, (8) the fourth stage wherein a mixed gas of ethylene with propylene containing 40 to 70% by weight of ethylene is fed to the reactor to copolymerize 6 to 23% by weight of the total polymerization amount (excluding soluble copolymer); and
(9) the intrinsic viscosity of the copolymer formed at the fourth stage $[\eta]_4$ satisfying the following equation:

$$[\eta]_L \leq [\eta]_4 \leq [\eta]_H \qquad (3).$$

(6) A process for producing an ethylene-propylene copolymer according to the above item (5), wherein
(1) at the first stage, a mixed gas of ethylene with propylene containing 1.5 to 4% by weight of ethylene is fed to the reactor to form a copolymer; successively,
(2) at the second stage, a mixed gas of ethylene with propylene is fed to the reactor to form a copolymer;
(3) the amount of ethylene fed at the first stage and the second stage is in the range of 1.5 to 4.0% by weight based on the total amount of the mixed gas;
(4) 70 to 86% by weight of the total polymerization amount (excluding soluble copolymer) is polymerized at the first stage and the second stage, and the proportion of the polymerization amount at the first stage to that at the second stage is in the range of 0.65:0.35 to 0.35:0.65;
(5) between the intrinsic viscosities of the polymers formed at the first stage and the second stage, the intrinsic viscosity of the polymer having a higher molecular weight $[\eta]_H$ and that of the polymer having a lower molecular weight $[\eta]_L$ have a relationship satisfying the following equation:

$$3.0 \leq [\eta]_H - [\eta]_L \leq 6.5 \qquad (1);$$
successively, (6) at the third stage, a mixed gas of ethylene with propylene containing 80 to 95% by weight is fed to the reactor to copolymerize 7 to 14% by weight of the total polymerization amount (excluding soluble copolymer);
(7) the intrinsic viscosity of a polymer formed at the third stage $[\eta]_3$ has a relationship satisfying the following equation:

$$[\eta]_L \leq [\eta]_3 \leq [\eta]_H \qquad (2);$$
successively, (8) at the fourth stage, a mixed gas of ethylene with propylene containing 45 to 55% by weight of ethylene is fed to the reactor to copolymerize 8 to 15% by weight of the total polymerization amount (excluding soluble copolymer); and
(9) the intrinsic viscosity of the copolymer formed at the fourth stage $[\eta]_4$ satisfies the following equation:

$$[\eta]_L \leq [\eta]_4 \leq [\eta]_H \qquad (3).$$

(7) A process for producing a copolymer according to the above item (5) wherein the organoaluminum compound (IV) is a dialkylaluminum monohalide.
(8) A process for producing a copolymer according to the above item (5) wherein a small amount of an α-olefin is reacted with the combination of the solid product (III) with the organoaluminum compound (IV) and the resulting preactivated catalyst is used as the catalyst.
(9) A process for producing a copolymer according to the above item (5) wherein at each of the first stage to the fourth stage, hydrogen is used to adjust the intrinsic viscosities of the respective polymers.

DETAILED DESCRIPTION OF THE PREFERRED EMBODIMENTS

Ethylene-propylene copolymer of the present invention is produced as follows: Propylene is copolymerized with ethylene at at least four stages using the so-called Ziegler-Natta catalyst consisting of a specified titanium trichloride composition, an organoaluminum compound, an aromatic carboxylic acid ester and a molecular weight modifier. As the titanium trichloride composition, there is used a solid product (III) obtained by reacting TiCl$_4$ with an organoaluminum compound (I) or a reaction product (VI) of an organoaluminum compound (I) with an electron donor (A) and subjecting the resulting solid product (II) to the following treatments (Note: I, II, III, VI, A and C are symbols in the present invention for discriminating raw materials for catalyst preparation and intermidiates).

Even if the above solid product (III) is replaced by other titanium trichloride compositions, it is impossible to attain the object of the present invention.

The solid product (III) is prepared as follows:

First, (i) an organoaluminum compound (I) is reacted with TiCl$_4$ (C) or (ii) a reaction product (VI) of the former with an electron donor (A) is reacted with the latter, to prepare a solid product (II). The method (ii) can yield a finally preferable titanium catalyst component.

The method (ii) is described in the specification of Japanese patent application No. Sho 55-12875 (1980) (Japanese patent application laid-open No. Sho 56-110707 (1981)) as follows:

The reaction of the organoaluminum compound (I) with the electron donor (A) is carried out in a solvent (D) at $-20°$ C. to 200° C., preferably $-10°$ C. to 100° C. for 30 seconds to 5 hours. The addition order of (I), (A) and (D) has no particular limitation, and the proportions of their amounts used are suitably 0.1 to 8 mols, preferably 1 to 4 moles of an electron donor and 0.5 to 5 l, preferably 0.5 to 2 l of a solvent, each per mole of an organoaluminum compound. The solvent is preferably aliphatic hydrocarbons. Thus a reaction product (VI) is obtained. This reaction product (VI) may be subjected to the subsequent reaction without separating it i.e. in a liquid state after completion of the reaction (often referred to as reaction liquid (VI)) as it is.

The reaction of the reaction product (VI) with TiCl$_4$ (C) is carried out at 0° to 200° C., preferably 10° to 90° C., for 5 minutes to 8 hours. Non-use of solvent is preferable, but aliphatic or aromatic hydrocarbons may be used. The mixing of (VI), (C) and the solvent may be carried out in any optional order, and the mixing of the total amount is preferably completed with 5 hours, and after the mixing of the total amount, reaction is preferred to be further continuously carried out at 10° to 90° C. within 8 hours. The respective amounts of the materials used in the reaction are 0 to 3,000 ml of a solvent per mol of TiCl$_4$ and an amount of (VI) in a ratio of 0.05 to 10, preferably 0.06 to 0.2 in terms of the ratio (Al/Ti) of the number of Al atoms in (VI) to the number of Ti atoms in TiCl$_4$. After completion of the reaction, liquid portion is separated and removed by filtering off or decantation, followed by repeated washings with solvent. The resulting solid product (II) may be used in a state where it is suspended in a solvent as it is, in the subsequent step, or may be further dried, taken out in the form of a solid matter and used.

The solid product (II) is then reacted with an electron donor (A) and an electron acceptor (B). This reaction may be carried out without solent, but when aliphatic hydrocarbons are used, preferable results are obtained. The respective amounts used are 10 g to 1,000 g, preferably 50 g to 200 g of (A), 10 g to 1,000 g, preferably 20 g to 500 g of (B) and 0 to 3,000 ml, preferably 100 to 1,000 ml of solvent, each based on 100 g of the solid product (II). These 3 substances or 4 substances are preferably mixed at $-10°$ C. to 40° C. for 30 seconds to 60 minutes and reacted at 40° C. to 200° C., preferably 50° C. to 100° C. for 30 seconds to 5 hours. The mixing order of the solid product (II), (A), (B) and solvent has no particular limitation. (A) and (B) may be reacted together in advance of mixing them with the solid product. In this case, there is used a reaction product obtained by reacting (A) with (B) at 10° to 100° C. for 30 minutes to 2 hours, followed by cooling down to 40° C. or lower. After completion of the reaction of the solid product (II) with (A) and (B), the reaction mixture is filtered or decanted to separate and remove a liquid portion, and repeatedly washed with solvent to remove unreacted liquid raw materials, whereby a solid product (III) is obtained. This solid product (III) is dried and taken out in the form of a solid matter, or used in a state where it is suspended in solvent as it is, at the subsequent step.

The thus obtained solid product (III) is combined with 0.1~500 g of an organoaluminum compound and a definite amount of an aromatic ester described later, each per g of the solid product (III) to obtain a catalyst of the present invention, or preferably an α-olefin is reacted with (III) to obtain a preactivated material to which the above ester is added, to obtain a catalyst of the present invention.

The organoaluminum compounds (IV) used in the present invention are expressed by the general formula AlR$_n$R'$_{n'}$X$_{3-(n+n')}$ wherein R and R' each represent a hydrocarbon group such as alkyl group, aryl group, alkaryl group, cycloalkyl group, etc. or alkoxy group; X represents a halogen such as fluorine, chlorine, bromine or iodine; and n and n' each represent an optional number of $0 < n+n' \leq 3$, and concrete examples are trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc.; alkylaluminum hydrides such as diethylaluminum hydride, dibutylaluminum hydride; and alkylaluminum sesqui or dihalides such as methylaluminum sesquichloride, ethylaluminum sesquichloride, ethylaluminum dichloride, i-butylaluminum dichloride, etc. Besides, alkoxyalkylaluminums such as monoethoxydiethylaluminum, diethoxymonoethylaluminum, etc. may be also used. These organoaluminum compounds may be employed in admixture of two or more kinds. The organoaluminum compound (I) for obtaining the solid product (VI) may be the same as or different from the organoaluminum compound (IV) to be combined with the solid product (III).

As for the electron donors (A) employed in the present invention, various kinds are illustrated below, but preferably ethers are mainly used and other electron donors are employed together with ethers. As for the electron donors employed, organic compounds containing at least one atom of oxygen, nitrogen, sulfur and phosphorus, such as ethers, alcohols, esters, aldehydes, fatty acids, ketones, nitriles amines, amides, ureas, thioureas, isocyanates, azo compounds, phosphines, phosphites, phosphinites, thioethers, thioalcohols, etc. Concrete examples are ethers such as diethyl ether, di-n-propyl ether, di-n-butyl ether, di(isoamyl) ether, di-n-pentyl ether, di-n-hexyl ether, di-i-hexyl ether, di-n- octyl ether, di-n-octyl ether, di-n-dodecyl ether, diphenyl ether, ethylene glycol monomethyl ether, diethylene glycol dimethyl ether, tetrahydrofuran, and the like; alcohols such as methanol, ethanol, propanol, butanol, pentanol, hexanol, octanol, etc., phenoles such as phenol, cresol, xylenol, ethylphenol, naphthol and the like; esters such as methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate and the like; aldehydes such as acetaldehyde, benzaldehyde and the like; fatty acids such as formic acid, acetic acid, propionic acid, butyric acid, oxalic acid, succinic acid, acrylic acid, maleic acid and the like; aromatic acids such as benzoic acid and the like; ketones such as methyl ethyl ketone, methyl isobutyl ketone, benzophenone and the like; nitriles such as acetonitrile, butylonitrile, etc.; amines such as methylamine, diethylamine, tributylamine, triethanolamine, β(N,N-dimethylamino)ethanol, pyridine, quinoline, α-picoline, N,N,N',N'-tetramethylhexaethylene diamine, aniline, dimethylaniline and the like; amides such as formamide, hexamethylphosphoric acid triamide, N,N,N',N',N''-pentamethyl-N-β-dimethylaminomethylphosphoric acid triamide, octamethylpyrophosphoroamide and the like; ureas such as N,N,N',N'-tetramethylurea and the like; isocyanates such as phenylisocyanate, toluylisocyanate and the like; azo-compounds such as azobenzene, azotoluene, and the like; phosphines such as ethylphosphine, triethylphosphine, tri-n-butylphosphine, tri-n-octylphosphine, triphenylphosphine, triphenylphosphine oxide and the like; phosphites such as dimethylphosphite, di-n-octylphosphite, triethylphosphite, tri-n-butylphosphite, triphenylphosphite; phosphinites such as ethyldiethylphosphinite, ethyldibutylphosphinite, phenyldiphenylphosphinite and the like; thioethers such as diehtyl thioether, diphenyl thioether, methyl phenyl thioether, ethylene sulfide, propylene sulfide and the like; and tioalcohols such as ethylthioalcohol, n-propylthioalcohol, thiophenol and the like. These electron donors (A) may be used in admixture of two or more kinds in an optional proportion.

The electron acceptors (B) employed in the present invention are represented by halides of elements of Groups III to VI of the Periodic Table. Concrete examples are anhydrous aluminum chloride, $SiCl_4$, $SnCl_2$, $SnCl_4$, $TiCl_4$, $ZrCl_4$, $PCl_3$, $PCl_5$, $VCl_4$, $SbCl_5$, etc. These may be used in admixture. $TiCl_4$ is most preferable.

As the solvent the following are used:

As aliphatic hydrocarbons, n-heptane, n-octane, i-octane, etc. are exemplified. Further, in place of or together with aliphatic hydrocarbons, halogenated hydrocarbons may also be used such as carbon tetrachloride, chloroform, dichloroethane, trichloroethylene, tetrachloroethylene, etc. As aromatic compounds, aromatic hydrocarbons such as benzene, naphthalene and their derivatives such as alkyl substitutes e.g. mesitylene, durene, ethylbenzene, isopropylbenzene, 2-ethylnaphthalene, 1-phenylnaphthalene, halogenated compounds e.g. monochlorobenzene, o-dichlorobenzene, etc. are exemplified.

The thus obtained solid product (III) is combined with an organoaluminum compound (IV) and the above aromatic carboxylic acid ester to obtain a catalyst which is then used for ethylene-propylene copolymerization according to conventional process, or preferably an α-olefin is reacted with the above catalyst to obtain a preactivated catalyst which is then used for the polymerization. As the organoaluminum compounds (IV), dialkylaluminum monohalides expressed by the formula $(AlR_1R_2X)$ are preferred. In the formula, $R_1$ and $R_2$ each represent a hydrocarbon group such as alkyl group, aryl group, alkaryl group, cycloalkyl group, etc. or an alkoxy group and X represents a halogen atom of F, Cl, Br or I. Concrete examples are diethylaluminum monochloride, di-n-butylaluminum monochloride, diisobutylaluminum monochloride, diethylaluminum monochloride, etc.

For the slurry or bulk polymerization, even a catalyst obtained by combining the solid product (III) with an organoaluminum compound exhibits a sufficient effectiveness, but for the gas phase polymerization, a catalyst having a higher activity, obtained by further reacting an α-olefin for preactivation is preferred. In the case of slurry or bulk polymerization followed by gas phase polymerization, even if the catalyst initially used is the former unpreactivated catalyst, this catalyst has already been reacted with propylene and ethylene in the stage of the gas phase polymerization; hence the catalyst has been changed into the same catalyst as the latter, to exhibit a superior effectiveness.

For the preactivation, it is preferred that an α-olefin be reacted using 0.1 to 500 g of an organoaluminum compound, 0 to 50 l of a solvent, 0 to 1,000 ml of hydrogen and 0.05 to 5,000 g, preferably 0.05 to 3,000 g of an α-olefin, each based on 1 g of the solid product (III) at 0° to 100° C. for one min. to 20 hours to have 0.01 to 2,000 g, preferably 0.05 to 200 g of the α-olefin reacted based on 1 g of the solid product (III).

The reaction of an α-olefin for the preactivation may be carried out either in an aliphatic or aromatic hydrocarbon solvent or in a liquefied α-olefin such as liquefied propylene, liquefied butene-1, etc. without using any solvent, or ethylene, propylene, etc. may be reacted in gas phase. Further it is also possible to carry out the preactivation in the coexistence of an α-olefin polymer preferably ethylene propylene copolymer prepared in advance or hydrogen.

The method for the preactivation includes various embodiments such as (1) a method wherein a catalyst obtained by combining the solid product (III) with an organoaluminum compound is contacted with an α-olefin and the resulting catalyst is used for the slurry, bulk or gas reaction; (2) a method wherein the solid product (III) is combined with an organoaluminum compound in the presence of an α-olefin; (3) a method wherein an α-olefin polymer is made coexistent in the methods (1) or (2); (4) a method wherein hydrogen is made coexistent in the methods (1), (2) or (3); etc. In the preactivation, it is also possible to add an aromatic carboxylic acid ester (V) in advance.

Examples of α-olefins used for the preactivation are straight chain monoolefins such as ethylene, propylene, butene-1, hexene-1, heptene-1, etc., branched chain monoolefins such as 4-methyl-pentene-1, 2-methyl-pentene-1, 3-methyl-butene-1, etc., styrene, etc. These α-olefins may be the same as or different from α-olefin to be polymerized, or may be used in admixture.

After the preactivation, the solvent, organoaluminum compound and unreacted α-olefin may be removed by distilling off under reduced pressure, filtering off, decantation, etc. to use the resulting material in the form of dry powder for polymerization; or the powder may be used in a state where it is suspended in a solvent within a range of 80 l or less based on 1 g of the solid product. Further it is also possible to add a fresh organoaluminum compound in the polymerization.

The thus obtained preactivated catalyst can be used for slurry polymerization wherein propylene and ethylene are copolymerized in a hydrocarbon solvent such as n-hexane, n-heptane, n-octane, benzene, toluene, etc. or bulk polymerization carried out in a liquefied propylene, or gas phase polymerization. However, in order to raise the stiffness of the objective ethylene-propylene copolymers, it is necessary to add an aromatic carboxylic acid ester (V) (hereinafter abbreviated to aromatic ester) to the catalyst (III) in a molar ratio of (V)/(III) of 0.1 to 10.0. If the amount of the aromatic ester added is less, improvement in the stiffness is insufficient, while if it is too large, the catalyst activity is reduced; hence such amounts are not practical. Concrete examples of the aromatic esters are ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, propyl naphthoate, butyl naphthoate, 2-ethylhexyl naphthoate, ethyl phenylacetate, etc. The molar ratio (Al/Ti) of the organoaluminum compound (IV) to the solid product (III) is 0.1 to 100, preferably 1 to 20. In this case the number of mols of the solid product (III) refers to substantially the number of g atoms of Ti. The polymerization temperature is usually in the range of 20° to 100° C., preferably 40° to 85° C. If the temperature is too low, the catalyst activity lowers and hence is not practical, while if it is too high, it is difficult to raise the stiffness. The polymerization is carried out under a polymerization pressure of the atmospheric pressure to 50 Kg/cm²G and usually for about 30 minutes to 15 hours.

The propylene copolymers of the present invention are prepared as follows: Propylene and ethylene are polymerized substantially at four stages, using the above-mentioned catalyst system consisting of the solid product (III), an aromatic ester, an organoaluminum compound and a molecular weight modifier. As to the polymerization conditions (temperature, pressure and time), those which are within known range may be employed, and as to the polymerization form, any known form of bulk polymerization, suspension polymerization and gas phase polymerization may be employed, so long as the multi-stage polymerization of the present invention is possible in the form.

The polymerization of the present invention will be described below.

In the present invention, the amount of the polymer part at the first stage (A) and that of the polymer part at the second stage (B) are preferred to be close to equal amount. Concretely, the amounts are both in the range of 35 to 65% by weight, preferably 40 to 60% by weight based on the total amount of (A)+(B). If the amounts exceed the above range, the resulting ethylene-propylene copolymer cannot have any sufficient melt flow properties, the kneading effect at the time of granulation is insufficient, and it is not only difficult to finally obtain a homogeneous molded product, but also the extent of improvement in melt-viscoelasticity is small. Further, the difference in molecular weight between both the polymer parts, too, must fall in the range of definite values as shown in the equation (1) mentioned below. Thus, the control of the polymerization condition therefor, is adjusted by the gas phase hydrogen concentration. Now, if the intrinsic viscosity (measured in tetralin solution at 135° C.) of the higher molecular weight part is named $[\eta]_H$ and that of the lower molecular weight part is named $[\eta]_L$, the above two must satisfy the following equation:

$$3.0 \leq [\eta]_H - [\eta]_L \leq 6.5 \quad (1)$$

Namely if $[\eta]_H - [\eta]_L < 3.0$, the melt flow characteristics at the time of melting for processing ethylene-propylene copolymer are insufficient and the extent of improvement in melt-viscoelasticity is also insufficient, to make it impossible to prevent the sagging at the time of the secondary processing of sheets. To the contrary if $[\eta]_H - [\eta]_L > 6.5$, the difference in molecular weight between the above parts (A) and (B) becomes excessive to increase non-uniformity between ethylene-propylene copolymer particles, and as a result, a greater surface-roughening occurs on the surface of molded products prepared from such an ethylene-propylene copolymer. Usually, the hydrogen concentration in the gas phase, in the case where $[\eta]_H$ of the present invention is formed is in the range of 3 to 40% by mol, while that in the case where $[\eta]_L$ is formed is in the range of 0.01 to 1.0% by mol.

In the first stage polymerization of the present invention, a mixed monomer of ethylene and propylene containing 0 to 7.5% by weight, preferably 1.5 to 4% by weight of ethylene is fed into a reactor to form a copolymer having an ethylene content of 0 to 5% by weight, preferably 1.0 to 3.0% by weight. At the second stage, a mixed monomer of ethylene and propylene containing 0 to 15% by weight, preferably 1.5 to 8.0% by weight of ethylene is fed to the reactor to form a copolymer having an ethylene content of 0 to 10% by weight, preferably 1.0 to 6.0% by weight. The ethylene amount based on the total monomer fed at the first stage and the second stage is made 0.7 to 7.5% by weight, preferably 1.5 to 4.0% by weight, and the ethylene content in the total copolymer formed at the first stage and the second stage is made 0.5 to 5% by weight, preferably 1.0 to 3.0% by weight. If the ethylene content in the total copolymer formed at the first stage and the second stage is less than 0.5% by weight, improvement in whitening is insufficient, while if it exceeds 5.0% by weight, stiffness, heat resistance, hardness, etc. lower. At the first stage and the second stage, ethylene may be fed in the same proportion or in a different proportion whtin the above range, but the ethylene amount based on the total amount of copolymers formed at the first stage and the second stage must fall in the above range. When the ethylene content at the first stage is made different from that at the second stage, the case where the ethylene content at the second stage is more than that at the first stage is preferable as compared with the contrary case to the above, since the amount of soluble copolymer byproduced is small and also the form of copolymer particles is good. The combined amount of copolymers formed at the first stage and the second stage is made 60 to 89% by weight, preferably 70 to 86% by weight based on the weight of the finally obtained copolymer (excluding soluble copolymer). Outside the above range, it is impossible to obtain polymers having all the objective values of physical properties harmonized.

The third stage polymerization of the present invention is carried out by feeding a mixed monomer of ethylene and propylene containing 70 to 100% by weight, preferably 80 to 95% by weight of ethylene, usually in the presence of hydrogen, to form a copolymer containing 85 to 100% by weight, preferably 90 to 98% by weight, of ethylene in an amount of 5 to 17% by weight, preferably 7 to 14% by weight based on the total amount of polymer (excluding soluable copolymer). If the ethylene content in the copolymer is less than 85% by weight, the effectiveness of whitening improvement aimed in the present invention is insufficient. When the ethylene content in the copolymer is 100%, molded products have a tendency of exhibiting a translucent white and hence having an inferior see-through; thus 98% by weight or less is preferred. The effects in the case where the polymerization amount at the third stage is outside the above range of 5 to 17% by weight, are almost similar to those in the above case where the ethylene content is outside the aforementioned range. Namely if the amount is less than 5% by weight, the effectiveness of whitening improvement is insufficient, while if it exceeds 17% by weight, the stiffness of the resulting copolymers lowers and also molded products are white and opaque. The molecular weight at the third stage is usually adjusted with hydrogen and the intrinsic viscosity ($[\eta]_3$) is preferably made a value between those at the first stage and the second stage. Namely $[\eta]_L \leq [\eta]_3 \leq [\eta]_H$ is preferable. In the case of $[\eta]_L > [\eta]_3$, the low temperature impact strength lowers, while in the case of $[\eta]_H < [\eta]_3$, surface-roughening occurs on the outer surface of sheets.

The polymerization at the fourth stage of the present invention, too, is carried out usually in the presence of hydrogen. A mixed monomer of ethylene and propylene containing 40 to 70% by weight, preferably 45 to 55% by weight of ethylene is fed to form a copolymer containing 65 to 80% by weight, preferably 70 to 75% by weight of ethylene, in an amount of 6 to 23% by weight, preferably 8 to 15% by weight based on the weight of the finally obtained copolymer (excluding soluble copolymer). If the ethylene content in the copolymer formed at the fourth stage is less than 65% by weight, the effectiveness of whitening improvement is insufficient as compared with the product of the present invention, while if it exceeds 80% by weight, the effectiveness of improvement in the impact strength is insufficient. The proportion of the copolymerization amount at the fourth stage (based on the total amount of polymers), too, is similar to that in the above case of the ethylene content, that is, if the amount is less than 6%, improvement in the impact strength is insufficient, while if it exceeds 23%, the resulting copolymer has an inferior whitening-resistant tendency and stiffness to those of the present invention.

The molecular weight at this stage ($[\eta]_4$) is adjusted with hydrogen in all the same manner as that at the third stage, that is, $[\eta]_L \leq [\eta]_4 \leq [\eta]_H$ is preferable. If $[\eta]_L > [\eta]_4$, the low temperature impact strength lowers, while if $[\eta]_H < [\eta]_4$, surface-roughening occurs on the surface of sheets.

According to the propylene copolymers of the present invention, there have been overcome the correlative limitations to various values of physical properties of copolymers obtained according to block copolymerization process (for example, improvement in the impact strength contrarily reduces the stiffness, heat resistance and whitening-resistance); as compared with contrast products obtained according to known process, there has been attained a notable improvement in the stiffness and whitening-resistance, while the impact strength values are maintained on the same level; and at the same time, sheet moldability and blow moldability have been notably improved. Thus, the products of the present invention are broadly applicable to various molding fields, and particularly in the fields of sheets, blow molding and injection molding, it is possible to expect improvement in the quality of molded products as well as increase in the use amount due to reduction in the thickness of sheets.

Further, when suitable amounts of nucleus-creating agent, organic filler and other physical properties-improving agents are blended to the copolymers of the present invention, to prepare ethylene-propylene block copolymer compositions, it is possible to produce molded products retaining well-balanced high stiffness, whitening-resistance and impact strength which have never been achieved by known contrast polypropylene compositions, and at the same time, having superior post-processability and blow moldability.

The present invention will be further described by way of Examples, but it is not construed to be limited thereby. Various measurement values in Examples were obtained according to the following methods:

(1) MFR: according to ASTMD-1238, 230° C., load 2.16 Kg (g/10 min.)
(2) [η]: measured in tetralin at 135° C.

The intrinsic viscosity at the second stage $[\eta]_2$ was sought from the equation below. Namely the intrinsic viscosity at the first stage $[\eta]_1$, the intrinsic viscosity of the total of polymer parts formed throughout the first stage and second stage $[\eta]_r$ and the polymerization proportions of polymer parts formed at the first stage and second stage, a and b, were measured, and $[\eta]_2$ was calculated from the following equation:

$$[\eta]_r = a[\eta]_1 + b[\eta]_2 = a[\eta]_1 + (1-a)[\eta]_2$$

(3) Reaction amounts and ethylene contents at the respective stages:

With regard to the first stage and the second stage, the content of the catalyst component (Ti) was measured according to fluorescent X-ray and the above values were calculated from the content. With regard to the third stage and the fourth stage, the above values were calculated from the ethylene content in the copolymer up to the respective stages and the ethylene content at each of the respective stages. The measurement of the ethylene contents at the first stage to the fourth stage was carried out according to NMR method and infrared absorption spectrum method.

(4) Method of measuring the physical properties of sheet-molded products (sheet thickness: 0.4 mm):
   Young's modulus: ASTM D882 (Kg f/mm$^2$)
   Punching impact strength: ASTM D781 (Kg f/cm)
   Folding whitening: According to Chisso method (mm); when a sheet was folded and whitening began to occur, the folded radius at that time was measured.
   Impact whitening: According to Chisso method; i.e. a piece of an injection-molded product of 50 mm × 50 mm × 0.4 mm (thick) was contacted with a point of impact having a semisphere of 3.2 mm in radius at its tip end, using a Du Pont impact tester at 23° C.;

200 g of a weight was dropped thereon from a height of 50 cm; and the diameter of whitened part (mm) was measured.

o: Almost no whitening is observed (less than 2 mm).

Δ: Considerable whitening is conspicuous (2~less than 4 mm).

x: Whitening is vigorous (more than 4 mm).

Sheet appearance: Viewed by naked eyes.

Heating behavior: According to Chisso method; in order to evaluate the heating vacuum formability of a sheet in a model manner, the sheet was fixed onto a frame of 40 cm×40 cm and placed in a constant temperature room at 200° C. to observe the following physical properties: (i) sag amount of sheet (mm), (ii) maximum recovery amount (note: {1/150×(150-sag amount at the time of maximum recovery)×100}), and (iii) retention time since the time of maximum recovery till the time of sag re-opening.

(5) Measurement of the physical properties of injection-molded products:

Bending modulus: JIS K 6758 (Kg f/cm$^2$)

Tensile strength: JIS K 6758 (Kg f/cm$^2$)

Hardness (Rockwell): JIS K 6758 (R-scale)

Izod impact strength (II): JIS K 6758 (Kg f cm/cm)

Spiral flow: Injected into a spiral form mold having a semi-circle of 6 mm in diameter and a pitch of 16 mm at a resin temperature of 250° C., an injected resin pressure of 500 Kg/cm$^2$ and a mold temperature of 50° C., to measure the length of injected resin (cm).

Whitening: This is almost the same as in the case of sheet except that the weight, height and the radius of the tip end of the point of impact were changed to 500 g, 1 m and 6.3 mm, respectively.

EXAMPLE 1

(1) Preparation of catalyst n-Hexane (600 ml), diethylaluminum monochloride (DEAC) (0.50 mol) and diisoamyl ether (1.20 mol) were mixed at 25° C. over one minute and the mixture was reacted at the same temperature for 5 minutes to obtain a reaction liquid (VI) (molar ratio of diisoamyl ether/-DEAC: 2.4). TiCl$_4$ (4.0 mols) was placed in a reactor purged with nitrogen, followed by heating it to 35° C., dropwise adding thereto the total quantity of the above reaction liquid (VI) over 180 minutes, keeping the mixture at the same temperature for 30 minutes, raising the temperature to 75° C., reacting it further for one hour, cooling down to room temperature, removing the supernatant, and 4 times repeating a procedure of adding n-hexane (4,000 ml) and removing the supernatant by decantation, to obtain a solid product (II) (190 g). To a suspension of the total quantity of this II in n-hexane (3,000 ml) were added diisoamyl ether (160 g) and TiCl$_4$ (350 g) at room temperature (20° C.) over about one minute and the mixture was reacted at 65° C. for one hour. After completion of the reaction, the reaction liquid was cooled down to room temperature (20° C.), followed by removing the supernatant by decantation, 5 times repeating a procedure of adding n-hexane (4,000 ml), stirring for 10 minutes, allowing the mixture to stand, and removing the supernatant, and drying under reduced pressure to obtain a solid product (III).

(2) Preparation of preactivated catalyst

Into a 20 l capacity, stainless reactor provided with slanted type stirring blades, and purged with nitrogen gas were added n-hexane (15 l), diethylaluminum monochloride (42 g) and the above solid product (III) (30 g) at room temperature, followed by introducing hydrogen (15 Nl), reacting propylene therewith under a propylene partial pressure (5 Kg/cm$^2$G) for 5 minutes, removing unreacted propylene, hydrogen and n-hexane under reduced pressure to obtain a preactivated catalyst (VII) in the form of powder (amount of propylene reacted per g of the solid product (III): 82.0 g).

(3) Propylene polymerization at the first stage

Into a 400 l capacity, stainless polymerization vessel provided with turbine type stirring blades were fed n-hexane (250 l), then diethylaluminum monochloride (60 g), the above preactivated catalyst (VII) (20 g) and methyl p-toluylate (22.0 g), followed by adding hydrogen (180 Nl), raising the temperature to 60° C., feeding propylene, raising the total pressure to 10 Kg/cm$^2$G to attain a state of 60° C. and 10 Kg/cm$^2$G, and feeding propylene containing 2.0% by weight of ethylene and continuing polymerization while keeping 60° C. and 10 Kg/cm$^2$G. During the polymerization, the hydrogen concentration in the gas phase was analyzed according to gas chromatography and hydrogen was added so as to keep 11.0 molar %. When the amount of the mixed gas of ethylene and propylene reached 20 Kg (in about 90 minutes), the monomer feed was stopped, followed by cooling the temperature within the vessel down to room temperature, venting hydrogen and unreacted monomer, and then withdrawing a portion of the polymerization slurry, which was subjected to [η] measurement and analysis of Ti in polymer according to fluorescent X-ray spectrometry to determine the polymer yield per unit weight of catalyst.

(4) Polymerization at the second stage

In this polymerization at the second stage, the temperature of the polymerization vessel was again raised to 60° C., hydrogen (3.0 Nl) was added, and propylene was fed to raise the total pressure up to 10 Kg/cm$^2$G. When a state of 60° C. and 10 Kg/cm$^2$G was attained, propylene containing 2.0% by weight of ethylene was fed and polymerization was continued while 60° C. and 10 Kg/cm$^2$G were kept. During the polymerization, the hydrogen concentration in the gas phase was analyzed according to gas chromatography and hydrogen was adjusted so as to keep 0.20 molar %. When the amount of a mixed gas of ethylene and propylene fed reached 20 Kg (in about 140 minutes), the monomer feed was stopped, followed by cooling the temperature inside the vessel down to room temperature, venting hydrogen and unreacted monomer, and withdrawing a portion of polymerization slurry, which was subjected to measurement of [η]$_r$ and analysis of Ti in polymer according to fluorescent X-ray spectrometry to determine the polymer yield per unit weight of catalyst.

(5) Polymerization at the third stage

In the polymerization at the third stage, the inside of the polymerization vessel was kept at 60° C. and 0.1 Kg/cm$^2$G and hydrogen (300 Nl) was fed, followed by continuously metering and feeding a mixed monomer of ethylene and propylene containing 90% by weight of ethylene. The gas phase hydrogen concentration during the polymerization was adjusted so as to give 35 molar %, since 30 minutes after initiation of the polymerization, and ethylene (5.5 Kg) was fed over 120 minutes, followed by cooling the temperature inside the vessel down to room temperature, venting hydrogen and unreacted monomer, withdrawing a portion of polymerization slurry and analyzing ethylene in copolymer.

(6) Polymerization at the fourth stage

As in the case of the third stage, the inside of the polymerization vessel was kept at 60° C. and 0.1 Kg/cm²G and hydrogen (100 Nl) was added, followed by feeding a mixed monomer of ethylene and propylene containing 50% by weight of ethylene continuously and at a definite rate. The gas phase hydrogen concentration during the polymerization was adjusted so as to give 15 molar %, since 30 minutes after initiation of the polymerization, and ethylene (5 Kg) was fed over 120 minutes, followed by cooling the temperature inside the polymerization vessel down to room temperature and venting hydrogen and unreacted monomer.

Methanol (25 l) was fed and the temperature was raised up to 75° C. After 30 minutes, 20% NaOH aqueous solution (200 g) was added, followed by stirring for 20 minutes, adding purified water (50 l), venting remaining propylene, withdrawing the aqueous layer, further adding purified water (50 l), water-washing with stirring for 10 minutes, withdrawing the aqueous layer, subjecting the ethylene-propylene copolymer-n-hexane slurry to centrifugal separation and drying to obtain ethylene-propylene copolymer powder.

The results of analysis are collectively shown in Table 1.

(7) Preparation and evaluation of sheet

To the white polymer powder obtained in the above item (6) (5 Kg) were added BHT (2,6-di-t-butyl-p-cresol) (5 g), Irganox 1010 (trade name of tetrakis [methylene(3,5-di-t-butyl-4-hydrocinnamete]methane) (2.5 g) and calcium stearate (10 g), followed by granulation. The granulated material was processed by an extrusion-molding machine (50 mmφ) at 225° C. into a sheet of 60 cm wide and 0.4 mm thick.

The measurement results are shown in Table A.

In the above evaluation results, the material having a superior vacuum formability refers to a material having a minimum sagging, a large recovery amount and a long retention time. Further, the material having a high stiffness refers to a material having a high Young's modulus and tensile yield strength.

COMPARATIVE EXAMPLES 1 AND 2

Example 1 was repeated except that the preactivated catalyst (VII) was replaced by a commercially available catalyst (AA type) obtained by reducing TiCl₄ with metal aluminum, followed by milling activation (30 g and 60 g), alone or together with methyl p-toluylate MPT) (0 g and 30 g), and conditions indicated in the Table were employed. As apparent from Table 1, even if the catalyst component of the present invention is replaced by a titanium trichloride (AA type), it is impossible to obtain any high stiffness copolymer. Further as seen from Comparative example 2, even if MPT is used together with the TiCl₃ (AA type), it is impossible to achieve stiffness improvement to a large extent.

COMPARATIVE EXAMPLE 3

Anhydrous MgCl₂ (20 g), ethyl benzoate (10.0 ml) and methylpolysiloxane (6.0 ml) were milled in a ball mill for 100 hours, the resulting solid product (15 g) was suspended in TiCl₄ (200 ml), followed by stirring at 80° C. for 2 hours, filtering to remove the liquid, washing the residue with n-hexane till no TiCl₄ was detected in the filtrate, and drying to obtain a solid catalyst. Example 1 was then repeated except that the preactivated catalyst of Example 1 was replaced by the above solid catalyst (10 g) and DEAC was replaced by TEA (10 g) and also conditions indicated in Table 1 was employed. As seen from the results in Table 1, when a supported type catalyst is used, it is impossible to obtain a high stiffness copolymer specific of the present invention.

COMPARATIVE EXAMPLE 4

In Example 1, in the reaction of preparing the solid product (II), the reaction liquid (VI) was replaced by DEAC (0.5 mol), followed by dropwise adding as in Example 1 at 0° C. in place of 35° C., raising the temperature to 75° C., reacting with stirring for one hour, refluxing at the boiling point of TiCl₄ (about 136° C.) for 4 hours to convert the material into a violet one, cooling, and washing, filtering and drying as in Example 1 to obtain a solid catalyst. Example 1 was then repeated except that the solid catalyst (50 g) was used and conditions indicated in the Table was employed. The results are shown in the Table. In this case, too, it is impossible to obtain any high stiffness copolymer as in Comparative examples 1~3.

EXAMPLES 2, 3 AND 4 AND COMPARATIVE EXAMPLES 5, 6 AND 7

In Example 1, the amount of MPT used was varied, and the amount of the preactivated catalyst used was varied as follows: 11 g (Example 2 and Comparative examples 5 and 6), 25 g (Example 3) and 40 g (Example 4 and Comparative example 7). Other conditions are indicated in Tables 1 and 2. The results are collectively shown in the Tables. As apparent from the Tables, if the molar ratio of aromatic ester/solid product (III) used in the polymerization is less than 0.05, improvement in the stiffness of the resulting copolymer is insufficient. Further, in the case of Comparative example 7, the catalyst activity was so low that the polymerization reaction rate lowered extremely; hence polymerization was stopped. Where the amount of aromatic ester is too large, the catalyst is deactivated and hence such a case is not practical.

EXAMPLES 5, 6 AND 7

Example 1 was repeated except that DEAC was replaced by the following organoaluminum compounds a~c:
a: di-n-propylaluminum monochloride (Example 5)
b: di-i-butylaluminum monochloride (Example 6)
c: diethylaluminum monoiodide (Example 7)

The polymerization conditions and results ae shown in Tables 1, 2 and A. As apparent from these Tables, in these Examples, almost the same results as in Example 1 were obtained.

EXAMPLES 8, 9, 10, 11, 12 AND 13

Example 1 was repeated except that MPT was replaced by the following aromatic esters in given amounts, d~i;

d: ethyl p-toluylate 24 g (Example 8)
e: butyl p-toluylate 28 g (Example 9)
f: methyl benzoate 20 g (Example 10)
g: ethyl benzoate 22 g (Example 11)
h: methyl p-anisate 24 g (Example 12)
i: ethyl p-anisate 26 g (Example 13)

The polymerization conditions and results are shown in Tables 3 and B. As apparent from these Tables, in these Examples, almost the same results as in Example 1 were obtained.

EXAMPLES 14~16 AND COMPARATIVE EXAMPLES 8~10

In order to observe the effect of the difference between the molecular weights at the first stage and the second stage, these examples were carried out in the same manner as in Example 1 except that the amount of hydrogen was varied as shown in Tables 3 and 4. The results are shown in Table B. If $[\eta]_H - [\eta]_L < 3$ as in Comparative examples 8 and 9, the heating characteristics of sheets are notably inferior to those of the present invention. Further if $[\eta]_H - [\eta]_L > 6.5$ as in Comparative example 10, the resins are inferior in elongation at the time of sheeting to make it impossible to obtain sheets having a uniform surface.

EXAMPLES 17 AND 18 AND COMPARATIVE EXAMPLES 11~13

Example 1 was repeated except that the amounts of ethylene fed at the first stage and the second stage were varied. The polymerization conditions are shown in Tables 4 and 5, and the results, in Tables B and C. If the ethylene contents at the first stage and the second stage are low, the stiffness is improved, but the whitening resistance is inferior and hence the object of the present invention cannot be attained. Further if the ethylene contents are too high as in Comparative example 13, the stiffness lowers and the collective balance of physical properties is inferior and hence the values of physical properties aimed in the present invention cannot be obtained.

EXAMPLES 19 AND 20

In Example 19, the ethylene feed at the second stage was omitted, and in Example 20, the ethylene feed at the first stage was omitted. Even if ethylene is fed at either one of the first stage or the second stage, it is possible to obtain the copolymers of the present invention, as seen from the results shown in Tables 7 and C.

COMPARATIVE EXAMPLE 14

Example 1 was repeated except that the third stage was omitted. As shown in Table C, the product is inferior particularly in impact whitening, in the case where the third stage is omitted.

COMPARATIVE EXAMPLE 15

Example 1 was repeated except that the fourth stage was omitted. As shown in Table C, the product is inferior in impact strength in the case where the fourth stage is omitted, and hence copolymers aimed in the present invention cannot be obtained.

EXAMPLES 21 AND 22 AND COMPARATIVE EXAMPLES 16~18

In Example 1, the molar ratio of ethylene/total monomers fed at the third stage was varied. If the ethylene content in the part polymerized at the third stage is less than 85%, the effectiveness of improvement in whitening resistance is small and hence the object of the present invention cannot be attained.

EXAMPLES 23 AND 24 AND COMPARATIVE EXAMPLES 19~21

In Example 1, the molar ratio of ethylene/total monomers fed at the fourth stage was varied. The polymerization conditions are shown in Tables 5 and 6, and the results, in Table D. If the ethylene content in the part polymerized at the fourth stage exceeds 80%, the effectiveness of improvement in the impact strength is small as in Comparative example 21. Further, if it is less than 65%, the effectiveness of improvement in the whitening resistance is small as in Comparative examples 19 and 20, and hence the copolymers aimed in the present invention cannot be obtained.

EXAMPLES 25 AND 26 AND COMPARATIVE EXAMPLES 22 AND 23

Example 1 was repeated except that the monomer feed time at the third stage was varied, and the reaction amount at the third stage was varied as shown in Table 7.

The results are collectively shown in Table D. As apparent from this Table, if the reaction amount at the third stage is small, the effectiveness of improvement in the whitening resistance is insufficient, while if it is too large, the translucent-white feeding becomes intense and its transparency becomes extremely inferior.

EXAMPLES 27 AND 28 AND COMPARATIVE EXAMPLES 24 AND 25

Example 1 was repeated except that the monomer feed time at the fourth stage was varied, and the reaction amount at the fourth stage was varied. As apparent from the results shown in Table D, in Comparative example 24, since the reaction amount at the fourth stage is small, the impact strength is inferior, while in Comparative example 25, since it is too large, the stiffness and whitening resistance are inferior.

EXAMPLES 29 AND 30

The polymerization order of the first stage and the second stage in Example 1 was inverted (Example 29). Further the polymerization order of the second stage and the third stage in Example 1 was inverted (Example 30). As apparent from the results shown in Table E, even when the polymerization order is inverted, it is possible to obtain copolymers aimed in the present invention.

EXAMPLES 31 AND 32 AND COMPARATIVE EXAMPLES 26 AND 27

These examples were carried out in almost the same as in Example 1 except that the proportion of the amounts polymerized at the first stage and the second stage was varied. As seen from the results shown in Table E, if the polymerization proportion is outside the range of the present invention, fish eyes (FE) appear on the surface of film as apparent from Comparative examples 26 and 27, to lose its commodity value, and the effectiveness of improvement in the heating behavior is also insufficient.

EXAMPLES 33~35 AND COMPARATIVE EXAMPLES 8 AND 28

Example 1 was repeated except that conditions indicated in Tables 9 and F were employed for varying MFR of final product. To the resulting propylene copolymer powder (8.0 Kg) were added a phenolic heat stabilizer (0.008 Kg) and calcium stearate (0.008 Kg), and these were blended by means of a high speed agitation type mixer (tradename: Henschel mixer) at room temperature for 10 minutes, followed by granulating the blend by means of an extrusion-granulator having a screw of 40.0 mm in inner diameter, injection-molding the granulated material by means of an extrusion-molding machine at a molten resin temperature of 230° C. and at a mold temperature of 50° C., into a test piece of JIS form, conditioning the test piece for 72 hours in a chamber of humidity 50% and room temperature (23° C.) and measuring the values of physical properties as shown in Table F.

As apparent from the results shown in Table F, in Comparative example 8 where the difference in molecular weight between the first stage and the second stage is not provided, the melt flowability of spiral flow is not improved. Further in Comparative example 28 where no aromatic ester is added, the stiffness is notably inferior to that of the present invention.

TABLE 1

| | | | Example 1 | Comparative example 1 | Comparative example 2 | Comparative example 3 | Comparative example 4 | Example 2 | Example 3 |
|---|---|---|---|---|---|---|---|---|---|
| Catalyst | Ester/solid product | Mol ratio | 1.0 | 0 | MPT 30 g | → | 1.0 | 0.2 | 2.0 |
| | Organoaluminum | | DEAC | → | → | → | DEAC | DEAC | → |
| | Kind of catalyst component | | Present invention | AA | → | Supported type | Reduction type | Present invention | → |
| 1st stage | $H_2$ (feed/in gas phase) | Nl/ mol % | 180/11.0 | 90/5.5 | 180/11.0 | 70/4.5 | 170/10 | 150/9 | 240/15 |
| | Ethylene fed/monomer fed | wt % | 2.0 | → | → | → | → | 2.0 | → |
| | Polymerization time | min. | 90 | → | → | → | → | 90 | → |
| 2nd stage | $H_2$ (feed/in gas phase) | Nl/ mol % | 3.0/0.20 | 1.3/0.08 | 3.0/0.20 | 1.3/0.08 | 3.0/0.20 | 1.1/0.06 | 1.7/0.10 |
| | Ethylene fed/monomer fed | wt % | 2.0 | → | → | → | → | 2.0 | → |
| | Polymerization time | min. | 140 | → | → | → | → | 140 | → |
| Analytical values of 1st stage and 2nd stage | Polymerization proportion (1st stage/2nd stage) | wt/wt | 52/48 | 54/46 | 51/49 | 48/52 | 53/47 | 54/46 | 50/50 |
| | $[\eta]_1/[\eta]_2$ | dl/g | 1.67/5.94 | 1.76/5.91 | 1.52/5.83 | 1.36/5.62 | 1.63/6.04 | 1.51/5.64 | 1.40/5.72 |
| | $[\eta]_{1,2}$ | " | 3.72 | 3.67 | 3.63 | 3.58 | 3.70 | 3.41 | 3.56 |
| | $[\eta]_H - [\eta]_L$ | " | 4.26 | 4.15 | 4.31 | 4.27 | 4.41 | 4.13 | 4.32 |
| | $C_2^=$ in polymer (1st stage/2nd stage) | wt % | 1.7/1.6 | 1.6/1.5 | 1.5/1.7 | 1.6/1.5 | 1.8/1.7 | 1.5/1.4 | 1.5/1.6 |
| 3rd stage | $H_2$ (feed/in gas phase) | Nl/ mol % | 300/35 | 260/30 | 300/35 | 260/30 | 300/35 | 260/30 | 300/35 |
| | Ethylene fed/monomer fed | wt % | 90 | → | → | → | → | 90 | → |
| | Polymerization time | min. | 120 | → | → | → | → | 120 | → |
| 4th stage | $H_2$ (feed/in gas phase) | Nl/ mol % | 100/15 | 60/12 | 100/15 | 70/10 | 100/15 | 90/13 | 100/15 |
| | Ethylene fed/monomer fed | wt % | 50 | → | → | → | → | 50 | → |
| | Polymerization time | min. | 120 | → | → | → | → | 120 | → |
| Analytical values of 3rd stage and 4th stage | Ethylene in the part polymerized at 3rd stage | wt % | 95 | 96 | 94 | 94 | 97 | 97 | 95 |
| | Ethylene in the part polymerized at 4th stage | wt % | 72 | 74 | 71 | 74 | 73 | 70 | 74 |
| | Polymerization proportion (1st + 2nd)/3rd/4th | wt ratio | 79/11/10 | 80/10/10 | 80/10/10 | 79/10/11 | 80/10/10 | 78/11/11 | 79/11/10 |
| | MFR of product | g/10 min. | 0.36 | 0.40 | 0.38 | 0.41 | 0.29 | 0.43 | 0.40 |

TABLE 2

| | | | Example 4 | Comparative example 5 | Comparative example 6 | Comparative example 7 | Example 5 | Example 6 | Example 7 |
|---|---|---|---|---|---|---|---|---|---|
| Catalyst | Ester/solid product | Mol ratio | 7.0 | 0 | 0.05 | 13.0 | 1.0 | → | → |
| | Organoaluminum | | DEAC | → | → | → | a | b | c |
| | Kind of catalyst component | | Present invention | → | → | → | Present invention | → | → |
| 1st stage | $H_2$ (feed/in gas phase) | Nl/ mol % | 390/22 | 100/6 | 120/7 | 380/23 | 180/11 | → | → |
| | Ethylene fed/monomer fed | wt % | 2.0 | → | → | → | 2.0 | → | → |
| | Polymerization time | min. | 90 | → | → | 60 | 90 | → | → |
| 2nd stage | $H_2$ (feed/in gas phase) | Nl/ mol % | 2.8/0.17 | 1.1/0.07 | 1.3/0.08 | Polymerization stopped | 3.0/0.20 | → | → |
| | Ethylene fed/monomer fed | wt % | 2.0 | → | → | | 2.0 | → | → |
| | Polymerization time | min. | 140 | → | → | | 140 | → | → |
| Analytical values of 1st stage and 2nd stage | Polymerization proportion (1st stage/2nd stage) | wt/wt | 52/46 | 53/47 | 49/51 | | 54/46 | 55/45 | 52/48 |
| | $[\eta]_1/[\eta]_2$ | dl/g | 1.43/5.69 | 1.55/5.88 | 1.40/5.55 | | 1.53/5.89 | 1.85/5.99 | 1.61/5.80 |

TABLE 2-continued

|  |  |  | Example 4 | Comparative example 5 | Comparative example 6 | Comparative example 7 | Example 5 | Example 6 | Example 7 |
|---|---|---|---|---|---|---|---|---|---|
|  | $[\eta]_{1.2}$ | " | 3.47 | 3.59 | 3.52 |  | 3.54 | 3.71 | 3.62 |
|  | $[\eta]_H - [\eta]_L$ | " | 4.26 | 4.33 | 4.15 |  | 4.36 | 4.14 | 4.19 |
|  | $C_2^=$ in polymer (1st stage/2nd stage) | wt % | 1.4/1.6 | 1.7/1.6 | 1.6/1.5 |  | 1.7/1.7 | 1.5/1.6 | 1.6/1.5 |
| 3rd stage | $H_2$ (feed/in gas phase) | Nl/mol % | 400/40 | 210/25 | 260/30 |  | 300/35 | → | → |
|  | Ethylene fed/monomer fed | wt % | 90 | → | → |  | 90 | → | → |
|  | Polymerization time | min. | 120 | → | → |  | 120 | → | → |
| 4th stage | $H_2$ (feed/in gas phase) | Nl/mol % | 120/17 | 70/10 | 70/10 |  | 160/15 | → | → |
|  | Ethylene fed/monomer fed | wt % | 50 | → | → |  | 50 | → | → |
|  | Polymerization time | min. | 120 | → | → |  | 120 | → | → |
| Analytical values of 3rd stage and 4th stage | Ethylene in the part polymerized at 3rd stage | wt % | 96 | 38 | 94 |  | 97 | 94 | 95 |
|  | Ethylene in the part polymerized at 4th stage | wt % | 75 | 72 | 72 |  | 71 | 74 | 73 |
|  | Polymerization proportion (1st + 2nd)/3rd/4th | wt ratio | 80/10/10 | 79/10/11 | 79/11/10 |  | 79/10/11 | 79/11/10 | 80/10/10 |
|  | MFR of product | g/10 min. | 0.42 | 0.36 | 0.42 |  | 0.50 | 0.35 | 0.41 |

TABLE 3

|  |  |  | Example 8 | Example 9 | Example 10 | Example 11 | Example 12 | Example 13 | Example 14 |
|---|---|---|---|---|---|---|---|---|---|
| Catalyst | Ester/solid product | Mol ratio | $^d$1.0 | $^e$→ | $^f$1.0 | $^g$→ | $^h$→ | $^i$→ | MPT→ |
|  | Organoaluminum |  | DEAC | → | DEAC | → | → | → | → |
|  | Kind of catalyst component |  | Present invention | → | Present invention | → | → | → | → |
| 1st stage | $H_2$ (feed/in gas phase) | Nl/mol % | 180/11 | → | 180/11 | → | → | → | 120/7.0 |
|  | Ethylene fed/monomer fed | wt % | 2.0 | → | 2.0 | → | → | → | → |
|  | Polymerization time | min. | 90 | → | 90 | → | → | → | → |
| 2nd stage | $H_2$ (feed/in gas phase) | Nl/mol % | 3.2/0.20 | → | 3.2/0.20 | → | → | → | 5.3/0.3 |
|  | Ethylene fed/monomer fed | wt % | 2.0 | → | 2.0 | → | → | → | → |
|  | Polymerization time | min. | 140 | → | 140 | → | → | → | → |
|  | Polymerization proportion (1st stage/2nd stage) | wt/wt | 49/51 | 51/49 | 53/47 | 55/45 | 53/47 | 48/52 | 52/48 |
| Analytical values of 1st stage and 2nd stage | $[\eta]_1/[\eta]_2$ | dl/g | 1.40/5.67 | 1.62/5.76 | 1.71/5.98 | 1.82/6.11 | 1.57/5.76 | 1.41/5.66 | 2.10/5.43 |
|  | $[\eta]_{1.2}$ | " | 3.58 | 3.65 | 3.72 | 3.75 | 3.54 | 3.62 | 3.70 |
|  | $[\eta]_H - [\eta]_L$ | " | 4.27 | 4.14 | 4.27 | 4.29 | 4.19 | 4.25 | 3.32 |
|  | $C_2^=$ in polymer (1st stage/2nd stage) | wt % | 1.7/1.5 | 1.5/1.5 | 1.5/1.6 | 1.7/1.6 | 1.5/1.7 | 1.4/1.5 | 1.6/1.7 |
| 3rd stage | $H_2$ (feed/in gas phase) | Nl/mol % | 300/35 | → | 300/35 | → | → | → | → |
|  | Ethylene fed/monomer fed | wt % | 90 | → | 90 | → | → | → | → |
|  | Polymerization time | min. | 120 | → | 120 | → | → | → | → |
| 4th stage | $H_2$ (feed/in gas phase) | Nl/mol % | 100/15 | → | 100/15 | → | → | → | → |
|  | Ethylene fed/monomer fed | wt % | 50 | → | 50 | → | → | → | → |
|  | Polymerization time | min. | 120 | → | 120 | → | → | → | → |
| Analytical values of 3rd stage and 4th stage | Ethylene in the part polymerized at 3rd stage | wt % | 96 | 94 | 96 | 98 | 95 | 97 | 94 |
|  | Ethylene in the part polymerized at 4th stage | wt % | 72 | 71 | 75 | 76 | 74 | 73 | 70 |
|  | Polymerization proportion (1st = 2nd)/3rd/4th | wt ratio | 76/12/12 | 78/11/11 | 78/12/10 | 81/10/9 | 78/11/11 | 79/11/10 | 78/11/11 |
|  | MFR of product | g/10 min. | 0.48 | 0.35 | 0.32 | 0.28 | 0.47 | 0.41 | 0.25 |

TABLE 4

|  |  |  | Example 15 | Example 16 | Comparative example 8 | Comparative example 9 | Comparative example 10 | Example 17 | Example 18 |
|---|---|---|---|---|---|---|---|---|---|
| Catalyst | Ester/solid product | Mol ratio | MPT 1.0 | → | → | → | → | MPT 1.0 | → |
|  | Organoaluminum |  | DEAC | → | → | → | → | DEAC | → |

TABLE 4-continued

|  |  |  | Example | | Comparative example | | | Example | |
| --- | --- | --- | --- | --- | --- | --- | --- | --- | --- |
|  |  |  | 15 | 16 | 8 | 9 | 10 | 17 | 18 |
| 1st stage | Kind of catalyst component |  | Present invention | → | → | → | → | Present invention | → |
|  | $H_2$ (feed/in gas phase) | Nl/mol % | 350/21 | 500/30 | 25/1.5 | 80/5.0 | 650/40 | 210/13 | → |
|  | Ethylene fed/monomer fed | wt % | 2.0 | → | → | → | → | 4.5 | 6.5 |
|  | Polymerization time | min. | 90 | → | 180 | 90 | → | 90 | → |
| 2nd stage | $H_2$ (feed/in gas phase) | Nl/mol % | 1.6/0.10 | 1/0.07 |  | 8/0.50 | 0.5/0.04 | 3/0.20 | → |
|  | Ethylene fed/monomer fed | wt % | 2.0 | → |  | 2.0 | → | 4.5 | 6.5 |
|  | Polymerization time | min. | 140 | → |  | 140 | → | 140 | → |
| Analytical values of 1st stage and 2nd stage | Polymerization proportion (1st stage/2nd stage) | wt/wt | 55/45 | 57/43 | 100/0 | 51/49 | 59/41 | 52/48 | 54/46 |
|  | $[\eta]_1/[\eta]_2$ | dl/g | 1.00/6.45 | 0.75/6.96 | 3.62/— | 2.40/4.87 | 0.56/7.70 | 1.54/5.75 | 1.62/5.94 |
|  | $[\eta]_{1.2}$ | " | 3.46 | 3.42 | → | 3.61 | 3.49 | 3.56 | 3.61 |
|  | $[\eta]_H-[\eta]_L$ | " | 5.45 | 6.21 | → | 2.47 | 7.14 | 4.21 | 4.32 |
|  | $C_2{=}$ in polymer (1st stage/2nd stage) | wt % | 1.5/1.6 | 1.7/1.5 | 1.6/— | 1.6/1.5 | 1.5/1.6 | 3.2/3.0 | 4.0/4.4 |
| 3rd stage | $H_2$ (feed/in gas phase) | Nl/mol % | 260/30 | → | 300/35 | → | → | 300/35 | → |
|  | Ethylene fed/monomer fed | wt % | 90 | → | → | → | → | 90 | → |
|  | Polymerization time | min. | 120 | → | → | → | → | 120 | → |
| 4th stage | $H_2$ (feed/in gas phase) | Nl/mol % | 100/15 | → | → | → | → | 100/15 | → |
|  | Ethylene fed/monomer fed | wt % | 50 | → | → | → | → | 50 | → |
|  | Polymerization time | min. | 120 | → | → | → | → | 120 | → |
| Analytical values of 3rd stage and 4th stage | Ethylene in the part polymerized at 3rd stage | wt % | 96 | 95 | 97 | 94 | 97 | 95 | 97 |
|  | Ethylene in the part polymerized at 4th stage | wt % | 74 | 73 | 74 | 72 | 71 | 74 | 74 |
|  | Polymerization proportion (1st + 2nd)/3rd/4th | wt ratio | 81/10/9 | 78/11/11 | 77/12/11 | 80/10/10 | 78/12/10 | 78/12/10 | 78/11/11 |
|  | MFR of product | g/10 min. | 0.43 | 0.45 | 0.39 | 0.40 | 0.43 | 0.39 | 0.32 |

TABLE 5

|  |  |  | Example | | Comparative example | | | | |
| --- | --- | --- | --- | --- | --- | --- | --- | --- | --- |
|  |  |  | 19 | 20 | 11 | 12 | 13 | 14 | 15 |
| Catalyst | Ester/solid product | Mol ratio | MPT 1.0 | → | MPT 1.0 | → | → | → | → |
|  | Organoaluminum |  | DEAC | → | DEAC | → | → | → | → |
|  | Kind of catalyst component |  | Present invention | → | Present invention | → | → | → | → |
| 1st stage | $H_2$ (feed/in gas phase) | Nl/mol % | 210/13 | 180/11 | 180/11 | → | 210/13 | 180/11 | → |
|  | Ethylene fed/monomer fed | wt % | 4.5 | 0 | 0 | 0.5 | 8.5 | 2.0 | → |
|  | Polymerization time | min. | 90 | → | 90 | → | → | → | → |
| 2nd stage | $H_2$ (feed/in gas phase) | Nl/mol % | 3/0.20 | → | 3/0.20 | → | 4/0.25 | 3/0.20 | → |
|  | Ethylene fed/monomer fed | wt % | 0 | 4.5 | 0 | 0.5 | 8.5 | 2.0 | → |
|  | Polymerization time | min. | 140 | → | 140 | → | → | → | → |
| Analytical values of 1st stage and 2nd stage | Polymerization proportion (1st stage/2nd stage) | wt/wt | 48/52 | 53/47 | 55/45 | 54/46 | 51/49 | 52/48 | 50/50 |
|  | $[\eta]_1/[\eta]_2$ | dl/g | 1.41/5.57 | 1.63/5.90 | 1.81/5.99 | 1.56/5.85 | 1.49/5.64 | 1.59/5.81 | 1.52/5.66 |
|  | $[\eta]_{1.2}$ | " | 3.57 | 3.64 | 3.69 | 3.53 | 3.52 | 3.62 | 3.59 |
|  | $[\eta]_H-[\eta]_L$ | " | 4.16 | 4.27 | 4.18 | 4.29 | 4.15 | 4.22 | 4.14 |
|  | $C_2{=}$ in polymer (1st stage/2nd stage) | wt % | 3.5/0 | 0/3.2 | 0/0 | 0.4/0.3 | 5.8/6.2 | 1.6/1.5 | 1.6/1.6 |
| 3rd stage | $H_2$ (feed/in gas phase) | Nl/mol % | 300/35 | → | 300/35 | → | → |  | 300/35 |
|  | Ethylene fed/monomer fed | wt % | 90 | → | 90 | → | → |  | 90 |
|  | Polymerization time | min. | 120 | → | 120 | → | → |  | 120 |
| 4th stage | $H_2$ (feed/in gas phase) | Nl/mol % | 100/15 | → | 100/15 | → | → | → |  |
|  | Ethylene fed/monomer fed | wt % | 50 | → | 50 | → | → | → |  |
|  | Polymerization time | min. | 120 | → | 120 | → | → | → |  |
| Analytical values of 3rd stage and 4th stage | Ethylene in the part polymerized at 3rd stage | wt % | 94 | 96 | 94 | 97 | 96 |  | 95 |
|  | Ethylene in the part polymerized at 4th stage | wt % | 71 | 75 | 72 | 74 | 71 | 73 |  |
|  | Polymerization proportion (1st + 2nd)/3rd/4th | wt ratio | 79/11/10 | 79/11/10 | 76/13/11 | 79/11/10 | 77/12/11 | 89/0/11 | 88/12/0 |
|  | MFR of product | g/10 min. | 0.36 | 0.28 | 0.30 | 0.35 | 0.38 | 0.37 | 0.44 |

TABLE 6

|  |  |  | Example | | Comparative example | | | Example | |
|---|---|---|---|---|---|---|---|---|---|
|  |  |  | 21 | 22 | 16 | 17 | 18 | 23 | 24 |
| Catalyst | Ester/solid product | Mol ratio | MPT 1.0 | → | → | → | → | MPT 1.0 | → |
|  | Organoaluminum |  | DEAC | → | → | → | → | DEAC | → |
|  | Kind of catalyst component |  | Present invention | → | → | → | → | Present invention | → |
| 1st stage | $H_2$ (feed/in gas phase) | Nl/ mol % | 180/11 | → | → | → | → | 180/11 | → |
|  | Ethylene fed/monomer fed | wt % | 2.0 | → | → | → | → | 2.0 | → |
|  | Polymerization time | min. | 90 | → | → | → | → | 90 | → |
| 2nd stage | $H_2$ (feed/in gas phase) | Nl/ mol % | 3.0/0.20 | → | → | → | → | 3.0/0.20 | → |
|  | Ethylene fed/monomer fed | wt % | 2.0 | → | → | → | → | 2.0 | → |
|  | Polymerization time | min. | 140 | → | → | → | → | 140 | → |
| Analytical values of 1st stage and 2nd stage | Polymerization proportion (1st stage/2nd stage) | wt/wt | 52/48 | 50/50 | 48/52 | 54/46 | 49/51 | 55/45 | 56/44 |
|  | $[\eta]_1/[\eta]_2$ | dl/g | 1.64/5.81 | 1.61/5.82 | 1.44/5.64 | 1.77/5.82 | 1.43/5.67 | 1.70/5.95 | 1.87/6.04 |
|  | $[\eta]_{1,2}$ | " | 3.64 | 3.71 | 3.62 | 3.68 | 3.59 | 3.61 | 3.75 |
|  | $[\eta]_H - [\eta]_L$ | " | 4.17 | 4.21 | 4.20 | 4.15 | 4.23 | 4.25 | 4.28 |
|  | $C_2^=$ in polymer (1st stage/2nd stage) | wt % | 1.6/1.5 | 1.5/1.5 | 1.7/1.6 | 1.6/1.5 | 1.7/1.4 | 1.4/1.3 | 1.5/1.6 |
| 3rd stage | $H_2$ (feed/in gas phase) | Nl/ mol % | 600/50 | 200/25 | 90/13 | 50/8 | 50/7 | 300/35 | → |
|  | Ethylene fed/monomer fed | wt % | 100 | 80 | 65 | 25 | 10 | 90 | → |
|  | Polymerization time | min. | 120 | → | → | → | → | 120 | → |
| 4th stage | $H_2$ (feed/in gas phase) | Nl/ mol % | 100/15 | → | → | → | → | 70/10 | 110/16 |
|  | Ethylene fed/monomer fed | wt % | 50 | → | → | → | → | 43 | 60 |
|  | Polymerization time | min. | 120 | → | → | → | → | 120 | → |
| Analytical values of 3rd stage and 4th stage | Ethylene in the part polymerized at 3rd stage | wt % | 100 | 90 | 82 | 53 | 29 | 95 | 98 |
|  | Ethylene in the part polymerized at 4th stage | wt % | 75 | 73 | 74 | 71 | 73 | 67 | 78 |
|  | Polymerization proportion (1st + 2nd)/3rd/4th | wt ratio | 77/13/10 | 78/12/10 | 78/12/10 | 80/10/10 | 79/11/10 | 79/11/10 | 79/11/10 |
|  | MFR of product | g/10 min. | 0.37 | 0.34 | 0.44 | 0.41 | 0.48 | 0.32 | 0.24 |

TABLE 7

|  |  |  | Comparative example | | | Example | | Comparative example | |
|---|---|---|---|---|---|---|---|---|---|
|  |  |  | 19 | 20 | 21 | 25 | 26 | 22 | 23 |
| Catalyst | Ester/solid product | Mol ratio | MPT 1.0 | → | → | MPT 1.0 | → | → | → |
|  | Organoaluminum |  | DEAC | → | → | DEAC | → | → | → |
|  | Kind of catalyst component |  | Present invention | → | → | Present invention | → | → | → |
| 1st stage | $H_2$ (feed/in gas phase) | Nl/ mol % | 180/11 | → | → | 180/11 | 230/14 | 180/11 | → |
|  | Ethylene fed/monomer fed | wt % | 2.0 | → | → | 2.0 | → | → | → |
|  | Polymerization time | min. | 90 | → | → | 90 | → | → | → |
| 2nd stage | $H_2$ (feed/in gas phase) | Nl/ mol % | 3.0/0.20 | → | → | 3.0/0.20 | → | → | → |
|  | Ethylene fed/monomer fed | wt % | 2.0 | → | → | 2.0 | → | → | → |
|  | Polymerization time | min. | 140 | → | → | 140 | → | → | → |
| Analytical values of 1st stage and 2nd stage | Polymerization proportion (1st stage/2nd stage) | wt/wt | 52/48 | 54/46 | 53/47 | 51/49 | 48/52 | 53/47 | 50/50 |
|  | $[\eta]_1/[\eta]_2$ | dl/g | 1.57/5.88 | 1.66/5.97 | 1.64/5.86 | 1.56/5.80 | 1.32/5.65 | 1.59/5.88 | 1.56/5.77 |
|  | $[\eta]_{1,2}$ | " | 3.58 | 3.64 | 3.62 | 3.64 | 3.57 | 3.61 | 3.66 |
|  | $[\eta]_H - [\eta]_L$ | " | 4.18 | 4.31 | 4.22 | 4.24 | 4.33 | 4.29 | 4.21 |
|  | $C_2^=$ in polymer (1st stage/2nd stage) | wt % | 1.4/1.5 | 1.7/1.6 | 1.5/1.6 | 1.7/1.6 | 1.5/1.4 | 1.6/1.4 | 1.5/1.6 |
| 3rd stage | $H_2$ (feed/in gas phase) | Nl/ mol % | 300/35 | → | → | 260/30 | 300/35 | 260/30 | 300/35 |
|  | Ethylene fed/monomer fed | wt % | 90 | → | → | 90 | → | → | → |
|  | Polymerization time | min. | 120 | → | → | 60 | 180 | 30 | 210 |
| 4th stage | $H_2$ (feed/in gas phase) | Nl/ mol % | 40/6 | 50/8 | 200/25 | 100/15 | → | → | → |
|  | Ethylene fed/monomer fed | wt % | 20 | 30 | 70 | 50 | → | → | → |
|  | Polymerization time | min. | 120 | → | → | 120 | → | → | → |
| Analytical values of 3rd stage and 4th stage | Ethylene in the part polymerized at 3rd stage | wt % | 94 | 93 | 96 | 94 | 97 | 96 | 95 |
|  | Ethylene in the part polymerized at 4th stage | wt % | 48 | 59 | 84 | 73 | 74 | 72 | 71 |
|  | Polymerization proportion (1st + 2nd)/3rd/4th | wt ratio | 77/12/11 | 78/11/11 | 80/10/10 | 82/6/12 | 85/15/10 | 85/3/12 | 72/20/8 |

TABLE 7-continued

| | | Comparative example | | | Example | | Comparative example | |
|---|---|---|---|---|---|---|---|---|
| | | 19 | 20 | 21 | 25 | 26 | 22 | 23 |
| MFR of product | g/10 min. | 0.36 | 0.31 | 0.35 | 0.35 | 0.41 | 0.37 | 0.31 |

TABLE 8

| | | | Example | | Comparative example | | Example | | |
|---|---|---|---|---|---|---|---|---|---|
| | | | 27 | 28 | 24 | 25 | 29 | 30 | 31 |
| Catalyst | Ester/solid product | Mol ratio | MPT 1.0 | → | → | → | MPT 1.0 | → | → |
| | Organoaluminum | | DEAC | → | → | → | DEAC | → | → |
| | Kind of catalyst component | | Present invention | → | →a | → | Present invention | → | → |
| 1st stage | $H_2$ (feed/in gas phase) | Nl/ mol % | 180/11 | → | → | → | 3.0/0.20 | 180/11 | 130/8 |
| | Ethylene fed/monomer fed | wt % | 2.0 | → | → | → | 2.0 | → | → |
| | Polymerization time | min. | 90 | → | → | → | 120 | 90 | → |
| 2nd stage | $H_2$ (feed/in gas phase) | Nl/ mol % | 3.0/0.2 | → | → | → | 180/11 | 3.0/0.2 | 1.6/0.1 |
| | Ethylene fed/monomer fed | wt % | 2.0 | → | → | → | 2.0 | → | → |
| | Polymerization time | min. | 140 | → | → | → | 120 | 140 | 100 |
| Analytical values of 1st stage and 2nd stage | Polymerization proportion (1st stage/2nd stage) | wt/wt | 52/48 | 54/46 | 52/48 | 47/53 | 52/48 | 62/38 | |
| | $[\eta]_1/[\eta]_2$ | dl/g | 1.54/5.79 | 1.64/5.82 | 1.58/5.85 | 1.44/1.59 | 5.93/1.82 | 1.57/5.82 | 1.98/6.26 |
| | $[\eta]_{1.2}$ | " | 3.58 | 3.56 | 3.63 | 3.64 | 3.72 | 3.61 | 3.61 |
| | $[\eta]_H - [\eta]_L$ | " | 4.25 | 4.18 | 4.27 | 4.15 | 4.11 | 4.25 | 4.28 |
| | $C_2^=$ in polymer (1st stage/2nd stage) | wt % | 1.5/1.6 | 1.6/1.5 | 1.5/1.5 | 1.6/1.5 | 1.5/1.4 | 1.6/1.5 | 1.5/1.7 |
| 3rd stage | $H_2$ (feed/in gas phase) | Nl/ mol % | 300/35 | → | → | → | 300/35 | 100/15 | 300/35 |
| | Ethylene fed/monomer fed | wt % | 90 | → | → | → | 90 | 50 | 90 |
| | Polymerization time | min. | 120 | → | → | → | 120 | → | → |
| 4th stage | $H_2$ (feed/in gas phase) | Nl/ mol % | 100/15 | → | 50/18 | 130/18 | 100/15 | 300/35 | 100/15 |
| | Ethylene fed/monomer fed | wt % | 50 | → | → | → | 50 | 90 | 50 |
| | Polymerization time | min. | 160 | 180 | 30 | 360 | 360 | → | → |
| Analytical values of 3rd stage and 4th stage | Ethylene in the part polymerized at 3rd stage | wt % | 93 | 94 | 95 | 94 | 94 | 74 | 96 |
| | Ethylene in the part polymerized at 4th stage | wt % | 70 | 72 | 74 | 74 | 73 | 94 | 72 |
| | Polymerization proportion (1st + 2nd)/3rd/4th | wt ratio | 83/11/6 | 74/8/18 | 85/12/3 | 64/7/29 | 79/11/10 | 79/10/11 | 79/11/10 |
| | MFR of product | g/10 min. | 0.34 | 0.33 | 0.31 | 0.30 | 0.37 | 0.29 | 0.41 |

TABLE 9

| | | | Example | Comparative example | | Example | | | Compar. ex. |
|---|---|---|---|---|---|---|---|---|---|
| | | | 32 | 26 | 27 | 33 | 34 | 35 | 28 |
| Catalyst | Ester/solid product | Mol ratio | MPT 1.0 | → | → | MPT 1.0 | → | → | 0 |
| | Organoaluminum | | DEAC | → | → | DEAC | → | → | → |
| | Kind of catalyst component | | Present invention | → | → | Present invention | → | → | → |
| 1st stage | $H_2$ (feed/in gas phase) | Nl/ mol % | 250/15 | 60/4 | 660/40 | 70/4 | 250/15 | 330/20 | 50/3 |
| | Ethylene fed/monomer fed | wt % | 2.0 | → | → | 2.0 | → | → | → |
| | Polymerization time | min. | 70 | 90 | 180 | 90 | → | → | 200 |
| 2nd stage | $H_2$ (feed/in gas phase) | Nl/ mol % | 8/0.5 | 1.3/0.08 | 8/0.5 | 0.5/0.01 | 8/0.5 | 13/0.8 | |
| | Ethylene fed/monomer fed | wt % | 2.0 | → | → | 2.0 | → | → | |
| | Polymerization time | min. | 140 | 80 | 140 | 140 | → | → | |
| Analytical values of 1st stage and 2nd stage | Polymerization proportion (1st stage/2nd stage) | wt/wt | 40/60 | 71/29 | 27/73 | 52/48 | 57/43 | 60/40 | 100/0 |
| | $[\eta]_1/[\eta]_2$ | dl/g | 1.34/4.97 | 2.42/6.61 | 0.57/4.80 | 2.77/8.28 | 1.21/4.96 | 0.97/4.49 | 2.50/— |
| | $[\eta]_{1.2}$ | " | 3.52 | 3.64 | 3.66 | 4.50 | 2.84 | 2.38 | 2.50 |
| | $[\eta]_H - [\eta]_L$ | " | 3.63 | 4.19 | 3.52 | 3.60 | 3.75 | 3.52 | → |
| | $C_2^=$ in polymer (1st stage/2nd stage) | wt % | 1.4/1.5 | 1.6/1.5 | 1.5/1.6 | 1.6/1.6 | 1.5/1.6 | 1.5/1.5 | 1.6/— |
| 3rd stage | $H_2$ (feed/in gas phase) | Nl/ mol % | 300/35 | → | → | 300/35 | → | → | → |
| | Ethylene fed/monomer fed | wt % | 90 | → | → | 90 | → | → | → |
| | Polymerization time | min. | 120 | → | → | 120 | → | → | → |
| 4th stage | $H_2$ (feed/in gas phase) | Nl/ mol % | 100/15 | → | → | 100/15 | → | → | → |

TABLE 9-continued

| | | | Example 32 | Comparative example 26 | Comparative example 27 | Example 33 | Example 34 | Example 35 | Compar. ex. 28 |
|---|---|---|---|---|---|---|---|---|---|
| Analytical values of 3rd stage and 4th stage | Ethylene fed/monomer fed | mol % | 50 | → | → | 50 | → | → | → |
| | Polymerization time | min. | 120 | → | → | 120 | → | → | → |
| | Ethylene in the part polymerized at 3rd stage | wt % | 94 | 97 | 95 | 93 | 95 | 98 | 94 |
| | Ethylene in the part polymerized at 4th stage | wt % | 74 | 71 | 72 | 74 | 75 | 73 | 75 |
| | Polymerization proportion (1st + 2nd)/3rd/4th | wt ratio | 79/11/11 | 79/11/10 | 77/12/11 | 78/12/10 | 78/11/11 | 78/11/11 | 78/11/11 |
| | MFR of product | g/10 min. | 0.46 | 0.37 | 0.33 | 0.07 | 1.5 | 5.1 | 3.9 |

TABLE A

| | | Example 1 | Comparative example 1 | Comparative example 2 | Comparative example 3 | Comparative example 4 | Example 2 | Example 3 | Example 4 | Comparative example 5 | Comparative example 6 | Example 5 | Example 6 | Example 7 |
|---|---|---|---|---|---|---|---|---|---|---|---|---|---|---|
| MFR (pellet) | g/10 min. | 0.36 | 0.39 | 0.45 | 0.48 | 0.33 | 0.41 | 0.37 | 0.40 | 0.38 | 0.35 | 0.45 | 0.31 | 4.2 |
| Physical properties of sheet | | | | | | | | | | | | | | |
| Appearance | | Good | → | → | → | → | → | → | → | Good | → | → | → | → |
| Heating behavior | | | | | | | | | | | | | | |
| Sag amount | mm | 29 | 33 | 36 | 34 | 29 | 34 | 32 | 29 | 33 | 32 | 31 | 27 | 32 |
| Recovery amount | % | 97 | 92 | 92 | 90 | 95 | 93 | 94 | 96 | 92 | 93 | 95 | 97 | 94 |
| Retention time | sec. | 32 | 20 | 23 | 17 | 26 | 24 | 31 | 28 | 21 | 24 | 23 | 34 | 23 |
| Young's modulus | Kg/mm$^2$ | 110 | 78 | 87 | 76 | 91 | 101 | 115 | 114 | 84 | 90 | 107 | 105 | 119 |
| Tensile yield strength | Kg/mm$^2$ | 4.1 | 3.2 | 3.4 | 3.1 | 3.5 | 3.8 | 4.2 | 4.2 | 3.4 | 3.5 | 3.9 | 3.9 | 4.4 |
| Punching impact strength | | | | | | | | | | | | | | |
| at 23° C. | Kg·cm | >30 | >30 | >30 | >30 | >30 | >30 | >30 | >30 | >30 | >30 | >30 | >30 | >30 |
| 0° | Kg·cm | >30 | >30 | >30 | >30 | >30 | >30 | >30 | >30 | >30 | >30 | >30 | >30 | >30 |
| −20° | Kg·cm | 28 | 26 | 16 | 12 | 25 | 17 | 19 | 15 | 22 | 23 | 12 | 27 | 13 |
| Folding whitening | mm | 3/1 | 3/1 | 4/1 | 3/1 | 3/1 | 3/1 | 4/1 | 4/1 | 3/1 | 3/1 | 3/1 | 3/1 | 4/1 |
| Impact whitening | Rank | | | | | | | | | | | | | |

TABLE B

| | | Example 8 | Example 9 | Example 10 | Example 11 | Example 12 | Example 13 | Example 14 | Example 15 | Example 16 | Comparative example 8 | Comparative example 9 | Comparative example 10 | Example 17 |
|---|---|---|---|---|---|---|---|---|---|---|---|---|---|---|
| MFR (pellet) | g/10 min. | 0.45 | 0.34 | 0.29 | 0.25 | 0.43 | 0.38 | 0.24 | 0.39 | 0.36 | 0.33 | 0.37 | 0.31 | 0.42 |
| Physical properties of sheet | | | | | | | | | | | | | | |
| Appearance | | Good | → | → | → | → | → | → | → | Good | → | → | Bad | Good |
| Heating behavior | | | | | | | | | | | | | | |
| Sag amount | mm | 32 | 33 | 30 | 26 | 31 | 30 | 30 | 27 | 27 | 39 | 36 | 27 | 32 |
| Recovery amount | % | 94 | 92 | 95 | 97 | 94 | 95 | 92 | 97 | 97 | 72 | 83 | 96 | 94 |
| Retention time | sec. | 23 | 18 | 30 | 34 | 25 | 26 | 21 | 36 | 42 | 7 | 13 | 32 | 23 |
| Young's modulus | Kg/mm$^2$ | 104 | 106 | 108 | 105 | 103 | 110 | 100 | 108 | 110 | 109 | 110 | 107 | 102 |
| Tensile yield strength | Kg/mm$^2$ | 3.9 | 4.0 | 4.0 | 3.9 | 3.9 | 4.1 | 4.1 | 4.1 | 4.1 | 4.1 | 4.1 | 4.0 | 3.9 |
| Punching impact strength | | | | | | | | | | | | | | |
| at 23° C. | Kg·cm | >30 | >30 | >30 | >30 | >30 | >30 | >30 | >30 | >30 | >30 | >30 | >30 | >30 |
| 0° | Kg·cm | >30 | >30 | >30 | >30 | >30 | >30 | >30 | >30 | >30 | >30 | >30 | >12 | >30 |
| −20° | Kg·cm | 10 | 21 | 25 | 32 | 20 | 23 | 24 | 21 | 26 | 18 | 16 | 8 | 26 |
| Folding whitening | mm | 3/1 | 31 | 3/1 | 3/1 | 3/1 | 4/1 | 3/1 | 3/1 | 3/1 | 3/1 | 3/1 | 4/1 | 2/1 |
| Impact whitening | Rank | | | | | | | | | | | | | |

TABLE C

| | | Example | | | Comparative example | | | | | Example | | Comparative example | | |
|---|---|---|---|---|---|---|---|---|---|---|---|---|---|---|
| | | 18 | 19 | 20 | 11 | 12 | 13 | 14 | 15 | 21 | 22 | 16 | 17 | 18 |
| MFR (pellet) | g/10 min. | 0.26 | 0.33 | 0.25 | 0.28 | 0.36 | 0.35 | 0.34 | 0.41 | 0.34 | 0.32 | 0.44 | 0.40 | 0.41 |
| Physical properties of sheet | | | | | | | | | | | | | | |
| Appearance | | Good | → | → | → | → | → | → | → | Good | → | → | → | → |
| Heating behavior | | | | | | | | | | | | | | |
| Sag amount | mm | 28 | 30 | 27 | 29 | 31 | 31 | 32 | 34 | 29 | 28 | 34 | 32 | 35 |
| Recovery amount | % | 97 | 95 | 96 | 94 | 93 | 94 | 93 | 91 | 96 | 95 | 90 | 92 | 89 |
| Retention time | sec. | 39 | 36 | 41 | 34 | 30 | 29 | 25 | 18 | 34 | 32 | 17 | 20 | 17 |
| Young's modulus | Kg/mm² | 94 | 112 | 109 | 125 | 118 | 74 | 114 | 120 | 112 | 108 | 105 | 106 | 105 |
| Tensile yield strength | Kg/mm² | 3.8 | 4.1 | 4.2 | 4.5 | 4.4 | 3.0 | 4.2 | 4.4 | 4.1 | 4.0 | 4.0 | 4.0 | 3.9 |
| Punching impact strength | | | | | | | | | | | | | | |
| at 23° C. | Kg·cm | >30 | >30 | >30 | >30 | >30 | >30 | >30 | 18 | >30 | >30 | >30 | >30 | >30 |
| 0° | Kg·cm | >30 | >30 | >30 | 25 | >30 | >30 | 24 | 7 | >30 | >30 | >30 | >30 | >30 |
| −20° | Kg·cm | >30 | 18 | 27 | 9 | 12 | >30 | 13 | 5 | 14 | 18 | >30 | >30 | >26 |
| Folding whitening | mm | 1/1 | 4/2 | 4/2 | 12/12 | 10/7 | 1/1 | 6/4 | 1/1 | 2/1 | 4/1 | 8/7 | 14/13 | 10/8 |
| Impact whitening | Rank | | | | X | Δ | | X | | | Δ | X | X | |

TABLE D

| | | Example | | Comparative example | | | Example | | Compar. ex. | Compar. ex. | Example | | Comparative example | |
|---|---|---|---|---|---|---|---|---|---|---|---|---|---|---|
| | | 23 | 24 | 19 | 20 | 21 | 25 | 26 | 22 | 23 | 27 | 28 | 24 | 25 |
| MFR (pellet) | g/10 min. | 0.27 | 0.20 | 0.35 | 0.28 | 0.33 | 0.32 | 0.36 | 0.34 | 0.26 | 0.35 | 0.30 | 0.27 | 0.27 |
| Physical properties of sheet | | | | | | | | | | | | | | |
| Appearance | | Good | → | → | → | → | → | → | → | Milky white | Good | → | → | → |
| Heating behavior | | | | | | | | | | | | | | |
| Sag amount | mm | 28 | 27 | 30 | 29 | 31 | 30 | 32 | 31 | 28 | 31 | 29 | 30 | 28 |
| Recovery amount | % | 97 | 98 | 95 | 96 | 93 | 94 | 93 | 94 | 96 | 95 | 96 | 94 | 96 |
| Retention time | sec. | 36 | 43 | 30 | 33 | 27 | 28 | 25 | 27 | 35 | 30 | 37 | 32 | 35 |
| Young's modulus | Kg/mm² | 109 | 111 | 105 | 106 | 113 | 115 | 105 | 117 | 102 | 114 | 103 | 115 | 91 |
| Tensile yield strength | Kg/mm² | 4.1 | 4.1 | 4.0 | 4.0 | 4.1 | 4.2 | 4.0 | 4.4 | 3.8 | 4.1 | 3.9 | 4.2 | 3.5 |
| Punching impact strength | | | | | | | | | | | | | | |
| at 23° C. | Kg·cm | >30 | >30 | >30 | >30 | >30 | >30 | >30 | >30 | >30 | >30 | >30 | 28 | >30 |
| 0° | Kg·cm | >30 | >30 | >30 | >30 | 11 | >30 | >30 | >30 | 25 | >30 | 28 | 12 | >30 |
| −20° | Kg·cm | >30 | 10 | >30 | >30 | 5 | 15 | >30 | 12 | >30 | 12 | >30 | 6 | >30 |
| Folding whitening | mm | 4/1 | 2/1 | 14/12 | 10/8 | 1/1 | 3/1 | 3/1 | 7/5 | 3/1 | 2/1 | 3/1 | 2/1 | 7/5 |
| Impact whitening | Rank | | | X | Δ | | | | Δ | | | | | Δ |

TABLE E

| | | Example | | | | Comparative example | |
|---|---|---|---|---|---|---|---|
| | | 29 | 30 | 31 | 32 | 26 | 27 |
| MFR (pellet) | g/10 min. | 0.34 | 0.25 | 0.37 | 0.44 | 0.35 | 0.30 |
| Physical properties of sheet | | | | | | | |
| Appearance | | Good | → | → | → | FE | FE |
| Heating behavior | | | | | | | |
| Sag amount | mm | 32 | 29 | 31 | 33 | 34 | 34 |
| Recovery amount | % | 93 | 97 | 90 | 91 | 85 | 86 |
| Retention time | sec. | 30 | 38 | 25 | 18 | 15 | 17 |
| Young's modulus | Kg/mm² | 108 | 111 | 109 | 111 | 112 | 109 |
| Tensile yield strength | Kg/mm² | 4.1 | 4.1 | 4.1 | 4.1 | 4.1 | 4.1 |
| Punching impact | | | | | | | |

TABLE E-continued

|  |  | Example | | | | Comparative example | |
|---|---|---|---|---|---|---|---|
|  |  | 29 | 30 | 31 | 32 | 26 | 27 |
| strength |  |  |  |  |  |  |  |
| at 23° C. | Kg · cm | >30 | >30 | >30 | >30 | >30 | >30 |
| 0° | Kg · cm | >30 | >30 | >30 | 25 | >30 | >30 |
| −20° | Kg · cm | 15 | 26 | 20 | 16 | 14 | 12 |
| Folding whitening | mm | 3/1 | 3/1 | 3/2 | 3/1 | 3/1 | 3/1 |
| Impact whitening | Rank |  |  |  |  |  |  |

TABLE F

| | | Values of physical properties of injection-molded products | | | | |
|---|---|---|---|---|---|---|
| | | Example | | | Comparative example | |
| | | 33 | 34 | 35 | 8 | 28 |
| MFR (pellet). | g/10 min. | 0.08 | 1.4 | 4.9 | 0.35 | 3.7 |
| Spiral flow | cm | 52 | 95 | 134 | 35 | 80 |
| Values of physical properties of injection-molded products | | | | | | |
| I I (23° C.) | Kg · cm/cm | 46 | 12.5 | 8.6 | 21 | 9.1 |
| Bending modulus | Kg/cm$^2$ | 14500 | 15200 | 14800 | 14700 | 12000 |
| Tensile strength | Kg/cm$^2$ | 290 | 305 | 307 | 302 | 256 |
| Hardness | Rockwell | 101 | 104 | 102 | 102 | 86 |
| Whitening | | Not whitened | → | → | → | → |

What we claim is:

1. A whitening-resistant, highly melt viscoelastic ethylene-propylene copolymer, obtained by copolymerizing propylene with ethylene, in the presence of a catalyst prepared by reacting an organoaluminum compound (I) or a reaction product (VI) of an organoaluminum compound (I) with an electron donor (A), with titanium tetrachloride (C), further reacting the resulting solid product (II) with an electron donor (A) and an electron acceptor (B), and combining the resulting solid product (III) with an organoaluminum compound (IV) and an aromatic caboxylic acid ester (V), the molar ratio (V/III) of the aromatic carboxylic acid ester to the solid product (III) being in the range of 0.1 to 10.0, at the following four stages:

(1) the first stage wherein propylene or a mixed gas of ethylene with propylene, containing 0 to 7.5% by weight of ethylene, is fed to a reactor to form a polymer; successively (2) the second stage wherein propylene or a mixed gas of ethylene with propylene, containing 0 to 15% by weight of ethylene is fed to the reactor to form a polymer;

(3) the amount of ethylene fed at the first stage and the second stage being in the range of 0.7 to 7.5% by weight based on the total amount of the mixed gas; (4) 60 to 89% by weight of the total polymerization amount (excluding soluble copolymer) being polymerized at the first stage and the second stage, and the proportion of the polymerization amount at the first stage to that at the second stage being in the range of 0.65:0.35 to 0.35:0.65;

(5) between the intrinsic viscosities of the polymers formed at the first stage and the second stage, the intrinsic viscosity of the polymer having a higher molecular weight $[\eta]_H$ and that of the polymer having a lower molecular weight $[\eta]_L$ having a relationship satisfying the following equation:

$$3.0 \leq [\eta]_H - [\eta]_L \leq 6.5 \quad (1);$$

successively, (6) the third stage wherein ethylene or a mixed gas of ethylene with propylene, containing 70 to 100% by weight of ethylene, is fed to the reactor to polymerize 5 to 17% by weight of the total polymerization amount (excluding soluble copolymer);

(7) the intrinsic viscosity of a polymer formed at the third stage $[\eta]_3$ having a relationship satisfying the following equation:

$$[\eta]_L \leq [\eta]_3 \leq [\eta]_H \quad (2);$$

successively (8) the fourth stage wherein a mixed gas of ethylene with propylene containing 40 to 70% by weight of ethylene is fed to the reactor to copolymerize 6 to 23% by weight of the total polymerization amount (excluding soluble copolymer); and (9) the intrinsic viscosity of the copolymer formed at the fourth stage $[\eta]_4$ satisfying the following equation:

$$[\eta]_L \leq [\eta]_4 \leq [\eta]_H \quad (3).$$

2. A copolymer according to claim 1 wherein the organo-aluminum compound (IV) is a dialkylaluminum monohalide.

3. A copolymer according to claim 1 wherein a small amount of an α-olefin is reacted with the combination of the solid product (III) with the organoaluminum compound (IV) and the resulting preactivated catalyst is used as the catalyst.

4. A copolymer according to claim 1 wherein at each of the first stage to the fourth stage, hydrogen is used to adjust the intrinsic viscosities of the respective polymers.

5. A copolymer according to claim 1 wherein the respective ethylene contents in the polymers or copolymers formed at the first stage to the fourth stage are in the ranges of 0 to 5% by weight, 0 to 10% by weight, 85 to 100% by weight and 65 to 80% by weight in the order of the stage number, but the ethylene content in the total of the polymers or copolymers formed throughout the first stage and the second stage is in the range of 0.5 to 5% by weight.

6. A copolymer according to claim 1 wherein the respective ethylene contents in the polymers or copolymers formed at the first stage to the fourth stage are in the range of 1.0 to 3.0% by weight, 1.0 to 6.0% by weight, 90 to 98% by weight and 70 to 75% by weight in the order of the stage number, but the ethylene content in the total of the polymers or copolymers formed throughout the first stage and the second stage is in the range of 1.0 to 3.0% by weight.

7. A process for producing a whitening-resistant, highly melt-viscoelastic ethylene-propylene copolymer, which process comprises copolymerizing propylene with ethylene, in the presence of a catalyst obtained by reacting an organoaluminum compound (I) or a reaction product (VI) or an organoaluminum compound (I) with an electron donor (A), with titanium tetrachloride (C), further reacting the resulting solid product (II) with an electron donor (A) and an electron acceptor (B), and combining the resulting solid product (III) with an organoaluminum compound (IV) and an aromatic carboxylic acid ester (V), the molar ratio (V/III) of the aromatic carboxylic acid ester to the solid product (III) being in the range of 0.1 to 10.0, at the following four stages:

(1) the first stage wherein propylene or a mixed gas of ethylene with propylene, containing 0 to 7.5% by weight of ethylene, is fed to a reactor to form a polymer; succesively (2) the second stage wherein propylene or a mixed gas of ethylene with propylene, containing 0 to 15% by weight of ethylene is fed to the reactor to form a polymer;

(3) the amount of ethylene fed at the first stage and the second stage being in the range of 0.7 to 7.5% by weight based on the total amount of the mixed gas;

(4) 60 to 89% by weight of the total polymerization amount (excluding soluble copolymer) being polymerized at the first stage and the second stage, and the proportion of the polymerization amount at the first stage to that at the second stage being in the range of 0.65:0.35 to 0.35:0.65;

(5) between the intrinsic viscosities of the polymers formed at the first stage and the second stage, the intrinsic viscosity of the polymer having a higher molecular weight $[\eta]_H$ and that of the polymer having a lower molecular weight $[\eta]_L$ having a relationship satisfying the following equation:

$$3.0 \leq [\eta]_H - [\eta]_L \leq 6.5 \qquad (1);$$
successively (6) the third stage wherein ethylene or a mixed gas of ethylene with propylene, containing 70 to 100% by weight of ethylene, is fed to the reactor to polymerize 5 to 17% by weight of the total polymerization amount (excluding soluble copolymer);

(7) the intrinsic viscosity of a polymer formed at the third stage $[\eta]_3$ having a relationship satisfying the following equation:

$$[\eta]_L \leq [\eta]_3 \leq [\eta]_H \qquad (2);$$
successively (8) the fourth stage wherein a mixed gas of ethylene with propylene containing 40 to 70% by weight of ethylene is fed to the reactor to copolymerize 6 to 23% by weight of the total polymerization amount (excluding soluble copolymer); and (9) the intrinsic viscosity of the copolymer formed at the fourth stage $[\eta]_4$ satisfying the following equation:

$$[\eta]_L \leq [\eta]_4 \leq [\eta]_H \qquad (3).$$

8. A process for producing an ethylene-propylene copolymer according to claim 7, wherein (1) at the first stage, a mixed gas of ethylene with propylene containing 1.5 to 4% by weight of ethylene is fed to the reactor to form a copolymer; successively (2) at the second stage, a mixed gas of ethylene with propylene containing 1.5 to 8% by weight of ethylene is fed to the reactor to form a copolymer;

(3) the amount of ethylene fed at the first stage and the second stage is in the range of 1.5 to 4.0% by weight based on the total amount of the mixed gas;

(4) 70 to 86% by weight of the total polymerization amount (excluding soluble copolymer) is polymerized at the first stage and the second stage, and the proportion of the polymerization amount at the first stage to that at the second stage is in the range of 0.65:0.35 to 0.35:0.65;

(5) between the intrinsic viscosities of the polymers formed at the first stage and the second stage, the intrinsic viscosity of the polymer having a higher molecular weight $[\eta]_H$ and that of the polymer having a lower molecular weight $[\eta]_L$ have a relationship satisfying the following equation:

$$3.0 \leq [\eta]_H - [\eta]_L \leq 6.5 \qquad (1);$$
successively (6) at the third stage, a mixed gas of ethylene with propylene containing 80 to 95% by weight is fed to the reactor to copolymerize 7 to 14% by weight of the total polymerization amount (excluding soluble copolymer);

(7) the intrinsic viscosity of a polymer formed at the third stage $[\eta]_3$ has a relationship satisfying the following equation:

$$[\eta]_L \leq [\eta]_3 \leq [\eta]_H \qquad (2);$$
successively (8) at the fourth stage, a mixed gas of ethylene with propylene containing 45 to 55% by weight is fed to the reactor to copolymerize 8 to 15% by weight of the total polymerization amount (excluding soluble copolymer); and (9) the intrinsic viscosity of a copolymer formed at the fourth stage $[\eta]_4$ satisfies the following equation:

$$[\eta]_L \leqq [\eta]_4 \leqq [\eta]_H \tag{3}$$

9. A process for producing a copolymer according to claim 7 wherein the organaluminum compound (IV) is a dialkylaluminum monohalide.

10. A process for producing a copolymer according to claim 7 wherein a small amount of an α-olefin is reacted with the combination of the solid product (III) with the organoaluminum compound (IV) and the resulting preactivated catalyst is used as the catalyst.

11. A process for producing a copolymer according to claim 7 wherein at each of the first stage to the fourth stage, hydrogen is used to adjust the intrinsic viscosities of the respective polymers.

* * * * *